United States Patent
Jones et al.

(10) Patent No.: US 11,556,125 B2
(45) Date of Patent: Jan. 17, 2023

(54) MAPPING, CONTROLLING, AND DISPLAYING NETWORKED DEVICES WITH A MOBILE CLEANING ROBOT

(71) Applicant: iRobot Corporation, Bedford, MA (US)

(72) Inventors: Christopher V. Jones, Woburn, MA (US); Stephen Ernest O'Dea, Bedford, MA (US); Philip Wasserman, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 16/236,844

(22) Filed: Dec. 31, 2018

(65) Prior Publication Data

US 2019/0212730 A1   Jul. 11, 2019

Related U.S. Application Data

(60) Provisional application No. 62/614,182, filed on Jan. 5, 2018.

(51) Int. Cl.
*A47L 9/28* (2006.01)
*G05B 19/4155* (2006.01)
(Continued)

(52) U.S. Cl.
CPC .......... *G05D 1/0044* (2013.01); *A47L 9/2826* (2013.01); *A47L 9/2894* (2013.01);
(Continued)

(58) Field of Classification Search
CPC .. A47L 9/2826; A47L 9/2894; A47L 2201/04; G05B 19/4155;
(Continued)

(56) References Cited

U.S. PATENT DOCUMENTS

| | | | |
|---|---|---|---|
| 7,024,278 B2 | 4/2006 | Chiappetta et al. | |
| 8,374,721 B2 | 2/2013 | Halloran et al. | |

(Continued)

FOREIGN PATENT DOCUMENTS

| | | |
|---|---|---|
| EP | 2570772 | 3/2013 |
| WO | WO 2014/113806 | 7/2014 |

OTHER PUBLICATIONS

International Search Report and Written Opinion in International Appln. No. PCT/US18/68144, dated Jun. 7, 2019, 17 pages.

(Continued)

*Primary Examiner* — Abby Y Lin
*Assistant Examiner* — Hossam M Abd El Latif
(74) *Attorney, Agent, or Firm* — Fish & Richardson P.C.

(57) ABSTRACT

A mobile cleaning robot that includes a drive system configured to navigate around an operational environment, a ranging device configured to communicate with other ranging devices of respective electronic devices that are in the operational environment, and processors in communication with the ranging device that are configured to receive a distance measurement from the respective electronic devices present in the operational environment, each distance measurement representing a distance between the mobile cleaning robot and a respective electronic device, tag each of the distance measurements with location data indicative of a spatial location of the mobile cleaning robot in the operational environment, determine spatial locations of each of the electronic devices in the operational environment, and (Continued)

populate a visual representation of the operating environment with visual indications of the electronic devices in the operating environment.

32 Claims, 15 Drawing Sheets

(51) Int. Cl.
  *G05D 1/00* (2006.01)
  *G05D 1/02* (2020.01)
(52) U.S. Cl.
  CPC ....... *G05B 19/4155* (2013.01); *G05D 1/0022* (2013.01); *A47L 2201/04* (2013.01); *G05B 2219/45098* (2013.01); *G05D 1/0088* (2013.01); *G05D 2201/0203* (2013.01); *G05D 2201/0215* (2013.01)
(58) Field of Classification Search
  CPC ....... G05B 2219/45098; G05D 1/0044; G05D 1/0022; G05D 2201/0203; G05D 2201/0215; G05D 1/0088; G05D 1/0274; G05D 1/028; G05D 2201/0207
  USPC .......................................................... 701/2
  See application file for complete search history.

(56) References Cited

U.S. PATENT DOCUMENTS

| | | | |
|---|---|---|---|
| 9,233,472 | B2 | 1/2016 | Angle et al. |
| 9,375,847 | B2 | 6/2016 | Angle et al. |
| 9,380,922 | B2 | 7/2016 | Duffley et al. |
| 11,348,269 | B1* | 5/2022 | Ebrahimi Afrouzi ... G06T 7/344 |
| 2009/0082879 | A1 | 3/2009 | Dooley et al. |
| 2016/0167234 | A1* | 6/2016 | Angle .................... B25J 13/006 |
| | | | 701/2 |
| 2016/0249781 | A1 | 9/2016 | Chen |
| 2017/0103624 | A1* | 4/2017 | Liu ........................ G08B 21/22 |
| 2017/0127236 | A1* | 5/2017 | Suzuki ................ H04L 67/5682 |
| 2017/0269572 | A1* | 9/2017 | Zhang ..................... B25J 13/06 |
| 2017/0361468 | A1* | 12/2017 | Cheuvront ............. G06F 16/00 |
| 2018/0342157 | A1* | 11/2018 | Donnelly ............. G08G 1/0145 |
| 2021/0147150 | A1* | 5/2021 | Huang ................... B25J 9/1692 |

OTHER PUBLICATIONS

EP Search Report in European Appln. No. 18898160.9, dated Dec. 22, 2021, 6 pages.

EP Partial Supplementary European Search Report in European Appln. No. 18898160.9, dated Sep. 21, 2021, 13 pages.

* cited by examiner

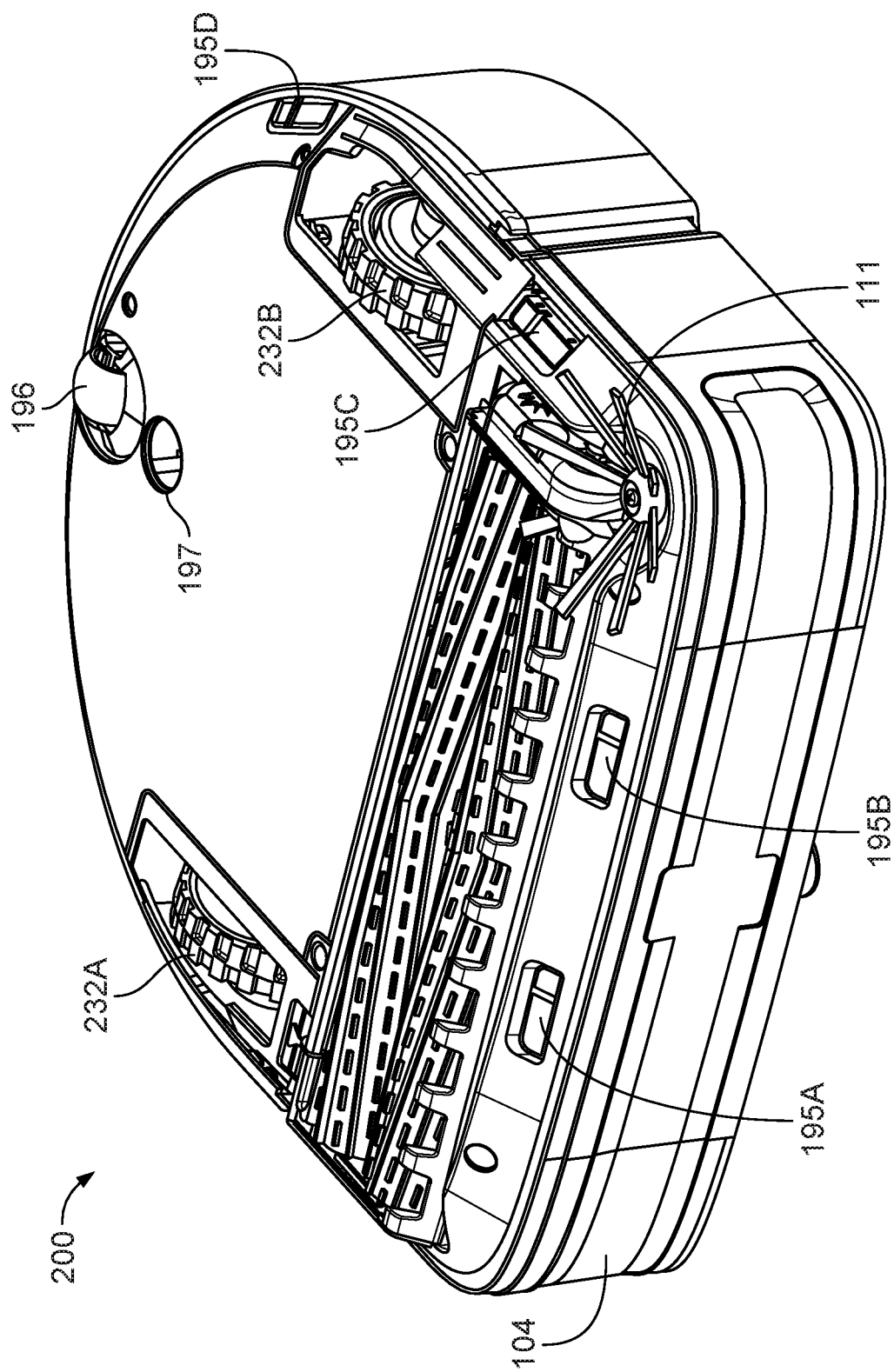

MAPPING, CONTROLLING, AND DISPLAYING NETWORKED DEVICES WITH A MOBILE CLEANING ROBOT

CROSS-REFERENCE TO RELATED APPLICATIONS

This application claims priority to U.S. Provisional Application Ser. No. 62/614,182, filed on Jan. 5, 2018, the entire contents of which are hereby incorporated by reference.

TECHNOLOGICAL FIELD

The present disclosure relates to connected devices and systems and methods for interoperation of the same.

BACKGROUND

Connectivity (including wireless connection to the Internet and remote clients) has been contemplated for household appliances for some time. The term "Internet of Things" (IoT) has come to represent the idea that household articles of all kinds can be connected to the public Internet. Once connected, such articles can report various data to server and client devices. For example, 'smart' light bulbs may be connected to a household WLAN (Wireless Local Area Network). Each light bulb may have a microprocessor, memory, some means of detecting or interpreting status, power, and a wireless connection. Using these components, the light bulb can report its status, can be polled, etc.

The concept of IoT may be considered distinct from household connectivity in general (for example, connected computers, cable boxes, media devices, and the like) in that the IoT devices may not typically include sufficient computing resources or communications to meaningfully connect to the public internet. A conventional refrigerator would not connect to the internet; the same device as an IoT device would include computational, sensor, and communications hardware and sufficient software to become an entity addressable remotely and locally; the expectation being that this Internet Fridge could report its various states (power consumption or the like) and respond to remote commands (increase or decrease internal temperature).

Household mobile robots may also become IoT devices. In some ways, household mobile robots may be considered a distinct species within this set. In particular, the autonomy of the household mobile robot may set it apart from other appliances, which do not perform in unpredictable and variable environment conditions or make autonomous decisions based on tens or hundreds of sensor inputs in order to achieve mission completion. For example, a dishwasher—even an IoT dishwasher—does not know anything about its contents and runs the equivalent of simple scripts controlling motors and pumps, potentially interrupted by simple clog or other sensors. In contrast, a vacuuming robot (such as an iRobot® Roomba® robot) may detect its own state in numerous ways during the course of its mission, and may flexibly escape from challenging situations in the household, as well as engage in predictive and planning activities. As such, there may be challenges in integrating the autonomous behavior of a household mobile robot with IoT device functionality.

SUMMARY

According to some embodiments of the present disclosure, a method of operating a user terminal includes receiving occupancy data for an operating environment responsive to navigation of the operating environment by a mobile robot, and displaying a visual representation of the operating environment based on the occupancy data. The method further includes receiving information identifying a plurality of electronic devices that are local to the operating environment and respective operating states thereof, and populating the visual representation of the operating environment with visual indications of respective spatial locations of the electronic devices in the operating environment and status indications of the respective operating states of the electronic devices.

According to some embodiments of the present disclosure, a method of operating a computing device includes receiving occupancy data for an operating environment responsive to navigation thereof by a mobile robot, and associating electronic devices that are local to the operating environment with respective spatial locations in the operating environment based on the occupancy data. The method further includes transmitting a control signal to one or more of the electronic devices to control operation thereof based on the respective spatial locations associated therewith.

Further features, advantages and details of the present disclosure, including any and all combinations of the above embodiments, will be appreciated by those of ordinary skill in the art from a reading of the figures and the detailed description of the embodiments that follow, such description being merely illustrative of the present disclosure.

BRIEF DESCRIPTION OF THE DRAWINGS

FIGS. 2A and 2B are top and bottom perspective views, respectively, of a mobile robot according to embodiments of the present disclosure, which is configured to operate in the system of FIG. 1A.

DETAILED DESCRIPTION

Figure 1A:
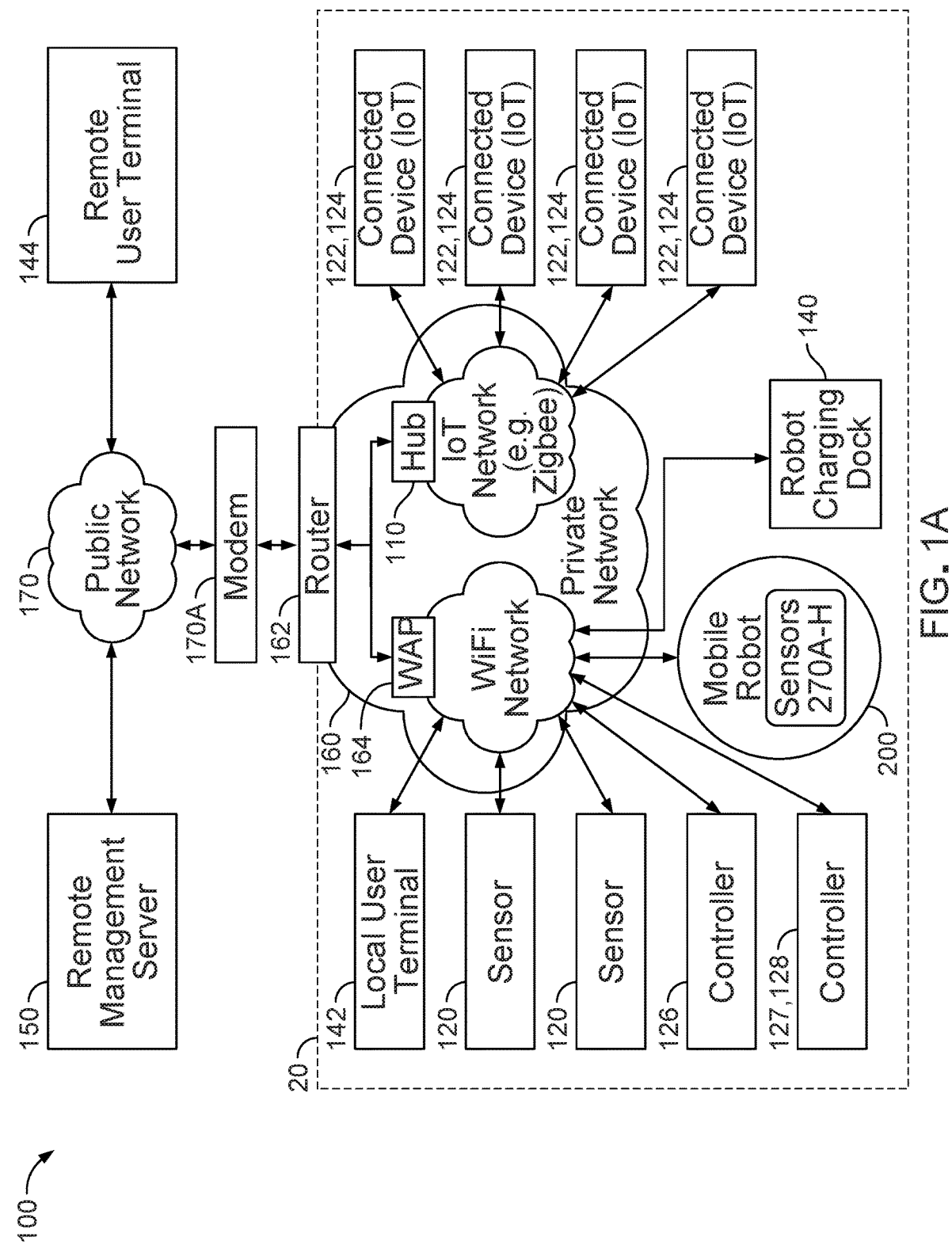
FIG. 1A is a schematic diagram representing a system according to embodiments of the present disclosure.

Embodiments of the present disclosure may arise from realization that the autonomous functionality of a mobile robot may present unique advantages for integration with IoT and/or other local device functionality based on its independent localization capabilities. In particular, the occupancy data collected by a mobile robot while navigating an operating environment (for example, in performing a cleaning mission or a patrolling mission in a household operating environment) may be used to determine respective spatial locations and operating states of other electronic devices in the relative spatial context of the operating environment, thereby providing a "whole-home" snapshot of device location and operation. Historical and scheduled operating state information for the electronic devices may also be stored and presented in response to a user request to allow viewing of actual past or present operating states and/or expected future operating states. An understanding of device spatial location and operating status as provided by embodiments of the present disclosure may further allow for control of connected electronic devices based on their respective spatial locations, the relative spatial context of the areas of the operating environment in which they are located, and/or operating conditions in adjacent areas of the operating environment.

The mobile robot determines respective spatial locations and operating states of other network-enabled electronic devices in the relative spatial context of the operating environment. The mobile robot determines a position of each of the network-enabled electronic devices (also referred to as "connected devices") in the operating environment based on signals received from each of the connected devices. The mobile robot includes a ranging device (described in further detail below with respect to FIG. 2C), and the connected devices each include corresponding ranging devices that are configured to communicate with the ranging device of the mobile robot. The ranging device of the mobile robot provides a distance to each corresponding ranging device of each of the connected devices in the operating environment. The mobile robot is configured to determine the positions of each of the connected devices in a map of the robot as the robot navigates the operating environment. As the mobile robot navigates the operating environment and gathers additional ranging data from the connected devices, the mobile robot can refine estimations of the positions of the connected devices in the map of the mobile robot. This process is described in greater detail below with respect to FIGS. 5-9.

A mobile robot may refer to any device including a processor, memory, and drive system for navigating variable environment conditions and making autonomous decisions based on a plurality of sensor inputs. Mobile robots as described herein, may include robot cleaners (such as iRobot® ROOMBA®, BRAAVA®, and/or BRAAVA Jet™ cleaners), as well as autonomous patrolling robots. Some such autonomous patrolling robots may include a telescoping mast having one or more sensor elements mounted thereon or otherwise operably associated therewith.

A connected device may refer to any device including or coupled to a network interface for transmitting and/or receiving wired or wireless communication signals via a wired or wireless personal, local, and/or wide area network. Such connected devices may include, but are not limited to, network controllers, sensors, terminals, and/or IoT devices. Other examples of such connected devices may include, but are not limited to, automated personal assistants (e.g., Amazon® Echo, Google® Assistant, etc.) lights/light bulbs, door/window sensors, door locks, speakers, thermostats, appliances, environmental sensors (temperature, humidity, air quality, illumination level), window blinds, voice interface devices, monitoring cameras, motion sensors, etc., having an integrated or other connection to a network interface. The wireless communication signals may include radio frequency signals, including but not limited to Wi-Fi signals, Bluetooth signals, ZigBee signals, and/or Z-wave signals, and/or optical signals. Such electronic devices may or may not include sufficient computing resources or communications to meaningfully connect to the public internet. Other electronic devices described with reference to the operating environments described herein may lack a network interface, and may be referred to as "non-connected devices."

Figure 1B:
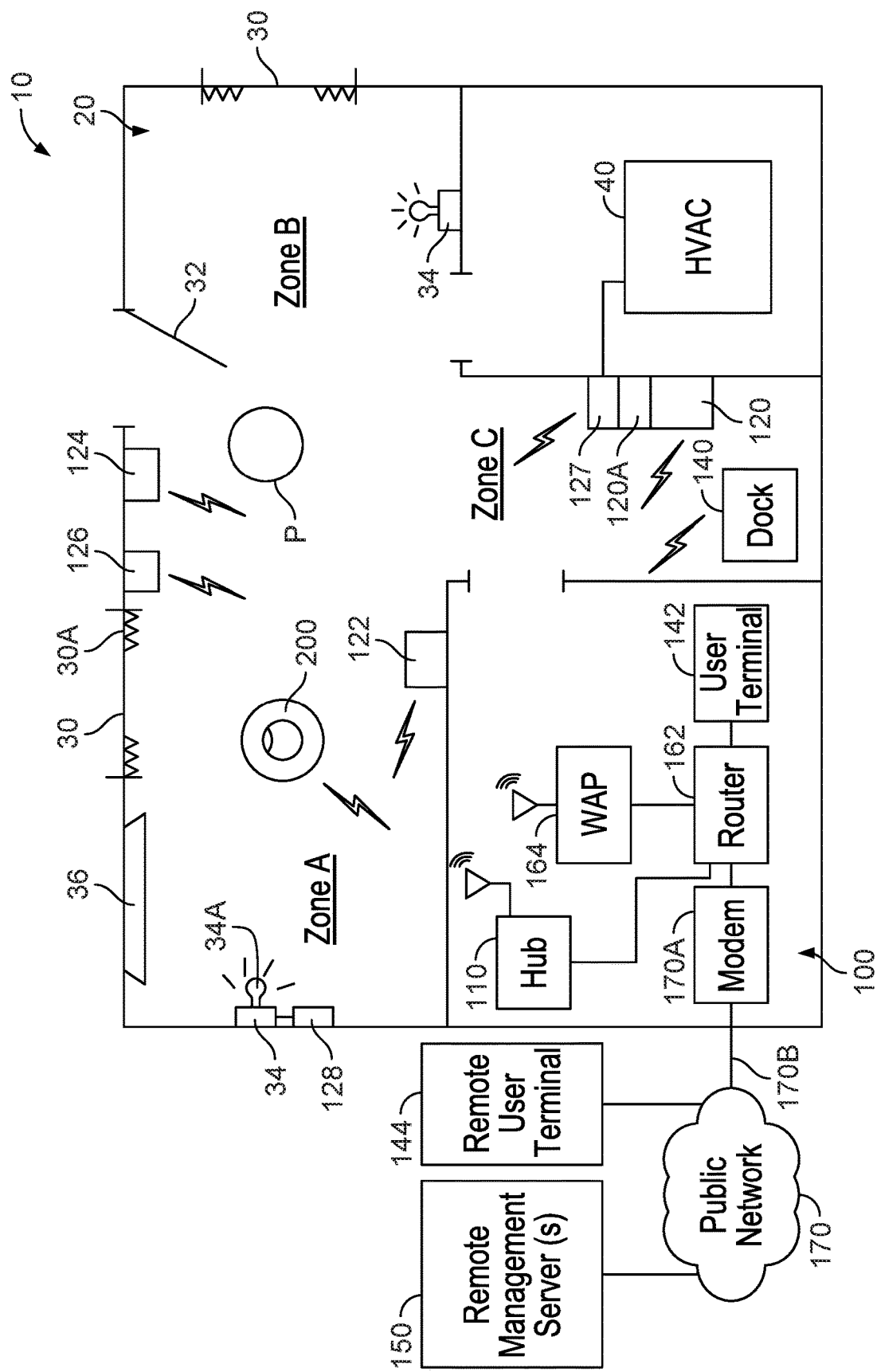
FIG. 1B is a schematic diagram illustrating an operating environment including the system of FIG. 1A installed therein according to embodiments of the present disclosure.

With reference to FIGS. 1A, 1B, a system 100 according to embodiments of the present disclosure is installed in an associated living structure 10. The structure 10 may be a home or residential dwelling, including but not limited to a single-family home, a multi-family dwelling (for example, a unit of a duplex, apartment, condominium, etc.), a mobile home, or a commercial living space (for example, an office or studio). The structure 10 may define a living space or interior space 20, also referred to herein as an operating environment. The living space 20 may be subdivided (physically, spatially and/or functionally) into one or more defined zones (illustrated as zones A-C). In some embodiments, the zones may correspond to areas of rooms in the living structure 10, such as Zone A being a Kitchen, Zone B being a Living Room and Zone C being a Bedroom. The defined zones A-C may be divided by walls or, as illustrated, may be open concept areas that have multiple, adjacent rooms that represent one broader contiguous living space, without wall division. The structure 10 has windows 30 (having blinds 30A coupled to controller 126), a door 32, light fixtures 34 and exhaustible lamps 34A (coupled to controller 128), a TV 36 (or other electronic equipment), and a heating, ventilation and air conditioning system (HVAC) 40 (coupled to controller 127). A user P may occupy the living space 20.

The system 100 includes nodes including a network-enabled mobile robot 200, one or more wireless access points (WAP) 164, gateways and/or hubs 110 that interconnect different networking methods to make a local area private network 160, which interconnects network-enabled or "connected" electronic devices (including IoT devices) 120, 122, 124, network-enabled automation controller devices 126, 127, 128, a robot dock 140 that may also be a network-enabled automation controller device, and products that may combine multiple such functions. The private network 160 may include one or more wireless access points (WAP) 164, gateways, or hubs 110 that have a combined wireless range to adequately cover at or around all or most of the living space 20 bounded by the living structure 10. In some embodiments, one or more of the network nodes 110, 126, 127, 128, 200, 140, 142, 144, and 150 may define a connected computing device (such as the computing device 300 of FIG. 3) that is configured to control operations of one or more other connected electronic devices 30A, 34/34A, 36, 40, 120, 122, 124, 126, 127, 128, 200, 140, 142, 144, and/or electronic devices connected thereto based on their respective spatial locations in the operating environment 20.

Networked devices connected to the private network 160 can communicate with a remote management service 150 through a router/firewall 162 to reach a public network 170, through a WAN interface 170A and its associated WAN connection 170B. For example, the remote management service 150 may be a cloud computing device, the public network 170 may be the Internet, the WAN interface 170A may be a DSL, DOCSIS or Cellular modem, and its associated WAN connection 170B may be provided by an Internet Service Provider (ISP). The router 162, the WAP 164 and/or the modem 170A may be integrated into a single device, in various configurations. A local user terminal 142 may be connected (wired or wirelessly) to the private network 160. A remote user terminal 144 may be connected to the remote server 150 and/or the private network 160 via the public network 170. For example, the user terminals 142, 144 may be a PC, smartphone, or tablet computer. The hub 110, the robot 200, the controllers 126, 127, 128, and the user terminals 142, 144 may each be accessed either through a common network service embodied in a target device (for example, a web server which presents a UI over the local network through a web browser on the client device) or via a specialized client (for example, a downloadable or pre-installed application software app) enabling communications and control between the nodes 110, 126, 127, 128, 200, 140, 142, 144, and 150 as described herein. A network entity as discussed herein is a machine and/or controller that registers on a network, is assigned a unique address for sending and receiving communication signals, and may be available to other network entity machines and/or controllers on the same network or a connected network.

In some embodiments, the "same network" may refer to a set of private addresses on a private IP (Internet Protocol) subnet behind a routing network entity 162 that provides Network Address Translation (NAT) between the public internet and the private network. Each network entity connected to the private network can deduce the network addresses of other active network entities either by observing their network communications, and/or scanning the possible IP subnet of the private network, looking for responses. Some gateways/hubs provide a network service that can enumerate what devices are associated with, and/or reachable through, that gateway/hub. These techniques yield one or both the IP address of each active device and/or their MAC (media access control) address. The Address Resolution Protocol (ARP) network service can map one type of address into the other. In some embodiments, a routine running on the processor of a network entity (such as the mobile robot 200) can collect the network address of other network entities (such as connected devices 120, 122, 124, 126, 127, 128) and identify a type, manufacturer, and/or model of the network entities, as well as their relative spatial locations in the living structure 10.

The robot dock 140 may include or be connected to a power supply and include a charger operative to charge a battery of the mobile robot 200 when the mobile robot 200 is effectively docked at the robot dock 140. The dock 140 may be an evacuation station including a motorized receptacle actuatable to empty debris from the robot 200. In some embodiments, the dock 140 is connected (wired or wirelessly) to the private network 160 to enable or facilitate transmission of data from the robot 200 to the private network 160 and/or from the private network 160 to the mobile robot 200. The robot dock 140 may thus be considered as an automation controller device. In some embodiments, the robot dock 140 communicates directly with the mobile robot 200 through wireless means, including but not limited to Bluetooth, nearfield induction, IR and/or radio communication signals. Each connected device 120, 122, 124, 126, 127, 128, 140, 142, 144 may include a wireless transceiver (such as a Wi-Fi transceiver) to communicate with the hub 110 and/or private network 160 via the WAP 164. While particular connected devices 30A, 34/34A, 36, 40, 110, 120, 122, 124, 126, 127, 128, 140, 142, 144, 150, 200 are shown by way of example, fewer or more connected devices may be included in the operating environment 10 and may be in communication with the private network 160.

Figure 2A:
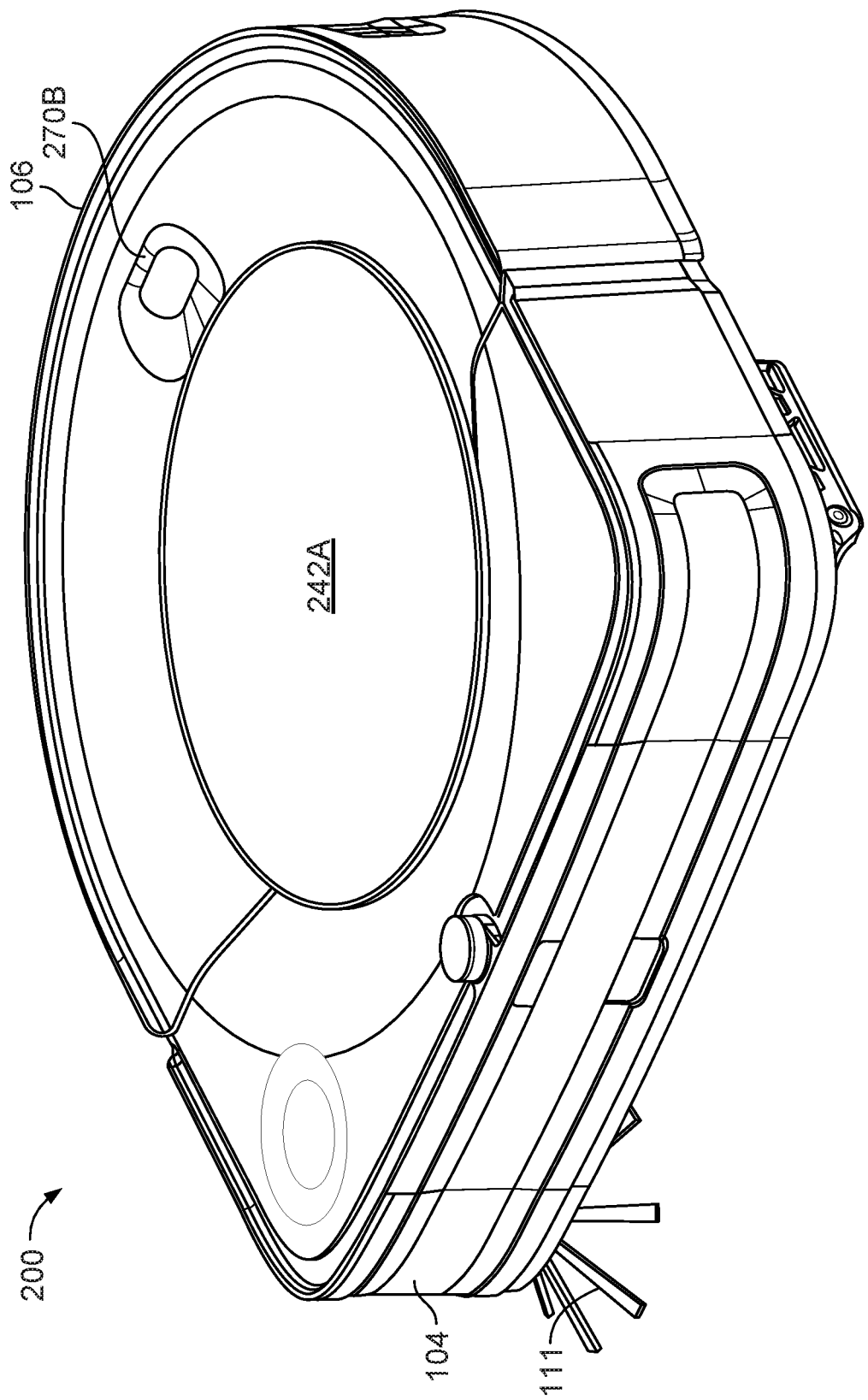
Figure 2C:
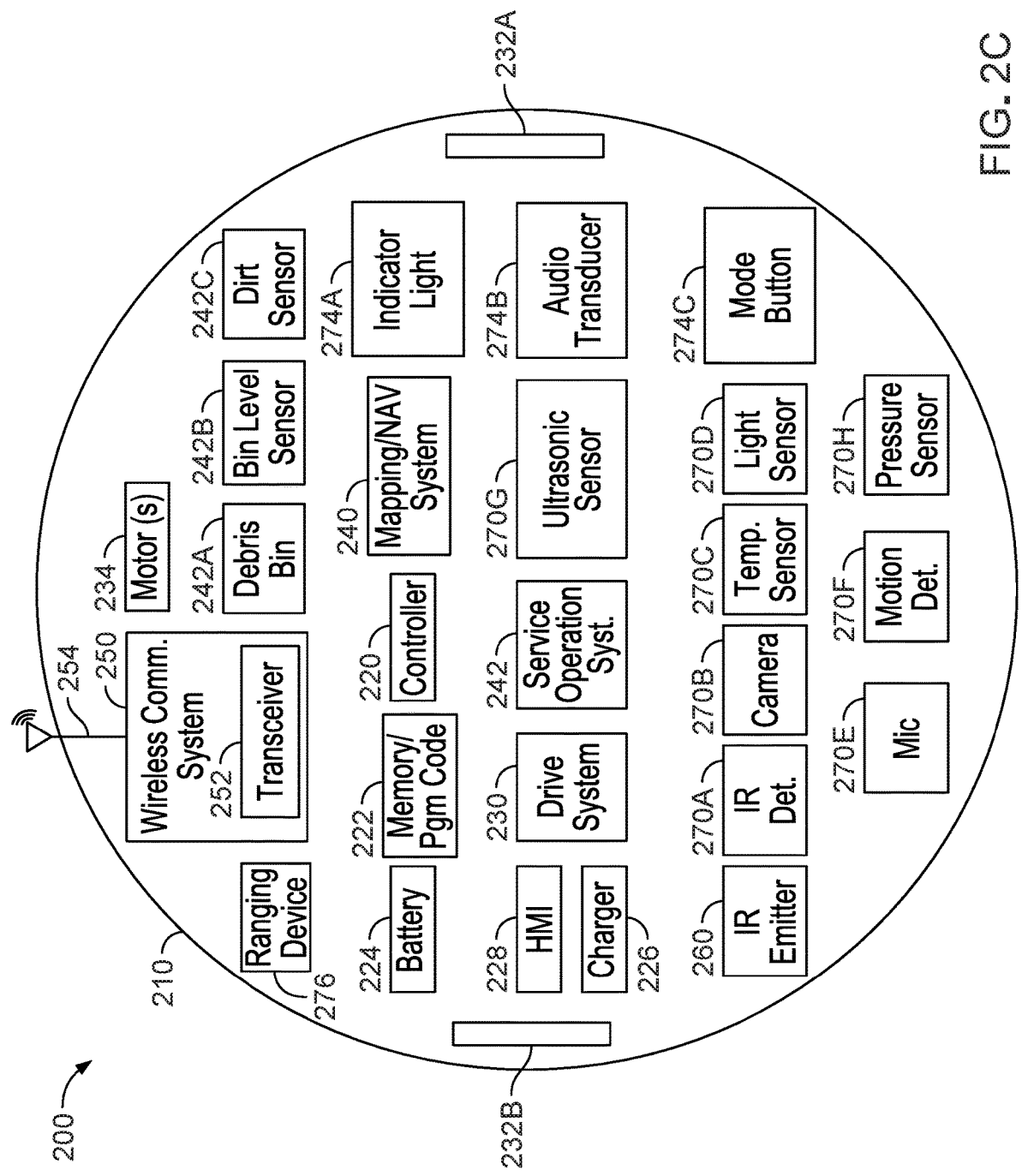
FIG. 2C is a schematic diagram representing a mobile robot according to embodiments of the present disclosure, which is configured to operate in the system of FIG. 1A.

The mobile robot 200 may be any suitable robot and associated computing device(s), and it will be appreciated that not all of the components, features and functionality described herein are required in mobile robots according to embodiments of the present disclosure. With reference to FIGS. 2A-2C, the example mobile robot 200 may include a chassis 210, a controller 220, memory 222, a battery 224, a battery charger 226, a human-machine interface (HMI) 228, a drive system 230, a mapping/navigation system 240, a service operation system 242 (also referred to herein as "cleaning system" and "cleaning head"), a wireless communication system 250, an IR emitter 260, environmental sensors 270A-H, a debris bin 242A (to store debris collected by a cleaning operation), a bin level sensor 242B, a dirt extraction sensor 242C (to detect the density of characteristics of the debris collected by the cleaning operation), an indicator light 274A, an audio transducer 274B, a ranging device 276, and a cleaning mode selection switch or button 274C.

The environmental sensors 270A-270H may include a camera 270B mounted on a top surface of the mobile robot 200, as shown in the top perspective view of FIG. 2A. The camera 270B can be used to navigate the robot 200 and acquire images for other operational use. In some embodiments, the camera 270B is a visual simultaneous location and mapping (VSLAM) camera and is used to detect features and landmarks in the operating environment and build an occupancy map based thereon.

As shown in the bottom perspective view of FIG. 2B, the mobile robot 200 may further include a bumper 104, cliff sensors 195A-195D, an edge brush 111 mounted or otherwise positioned at a periphery of the mobile robot housing 106. The housing 106 is illustrated in FIGS. 2A-2B as having a squared front section on which the bumper 104 is mounted; however, the housing may have a rounded or circular shape in other embodiments. A caster wheel 196 may be provided on the underside of the mobile robot 200. In some embodiments, the caster wheel 196 may be positioned at an opposite end of the mobile robot 200 than the cleaning head 242, with the drive rollers/tracks 232A, 232B therebetween, such that the cleaning head 242 is a cantilevered arrangement. The mobile robot 200 may also include downward- or floor-facing camera 197. In some embodiments, the mobile robot 200 may be generally configured in the manner of or include features from the Roomba® floor cleaning robot and/or robots as described in U.S. Pat. No. 7,024,278 and U.S. Published Application No. U.S. Pat. No. 8,374,721, the disclosures of which are incorporated herein by reference, with suitable modifications. In other embodiments, the mobile robot 200 may be generally configured as an autonomous patrolling robot that includes a telescoping mast having one or more elements associated with the sensor elements 270A-H and/or the wireless communication circuit or system 250 mounted thereon or otherwise operably associated therewith.

The controller 220 may include any suitably configured processor or processors. The processor(s) may include one or more data processing circuits, such as a general purpose and/or special purpose processor (such as a microprocessor and/or digital signal processor) that may be collocated or distributed across one or more networks. The processor is configured to execute program code stored in the memory 222, described below as a computer readable storage medium, to perform some or all of the operations and methods that are described above for one or more of the embodiments. The memory 222 is representative of the one or more memory devices containing the software and data used for facilitating operations of the robot in accordance with some embodiments of the present disclosure. The memory 222 may include, but is not limited to, the following types of devices: cache, ROM, PROM, EPROM, EEPROM, flash, SRAM, and DRAM. The processor is thus in communication with the controller 200, memory 222, the cleaning system 242 and drive system 230.

The drive system 230 may include any suitable mechanism or system for actively and controllably transiting the robot 200 through the living space 20. According to some embodiments, the drive system 230 includes a roller, rollers, track or tracks 232A, 232B and one or more onboard (i.e., carried by the mobile robot 200) electric motors 234 (collectively referred to herein as a "drive" or "drive system") operable by the controller 220 to convey the robot 200 across the floor of the operating environment 10.

The service operation system 242 may be optional in some embodiments, and is operable to execute a service operation in the living space 20. According to some embodiments, the service operation system 242 includes a floor cleaning system that cleans a floor surface of the living space 20 as the robot 200 transits through the space 20. In some embodiments, the service operation system 242 includes a suction head and an onboard vacuum generator to vacuum clean the floor. In some embodiments, the service operation system 242 includes an end effector such as (but not limited to) a sweeping or mopping mechanism, one or more rotating brushes, rollers, wet or dry stationary or oscillating and/or vibrating cloths, or multilayer pad assemblies.

The wireless communication system 250 includes a wireless communication transceiver or module 252 and an associated antenna 254 to enable wireless communication between the robot 200 and the various other connected devices 120, 122, 124, 126, 127, 128 in the operating environment 10, as well as network segments serviced by WAPs, gateways and hubs which make up the private network 160, of which the mobile robot 200 constitutes a node. For example, the wireless communication transceiver or module 252 may be a Wi-Fi module.

In some embodiments, the robot 200 may communicate wirelessly directly with the dock 140 using narrowband or broadband RF communication. For example, if the robot 200 is not equipped with a transmitter compatible with the WAP 164, the robot 200 may communicate with the dock 140, which may in turn relay data from the robot 200 onto the private network 160 and onward to the intended network entity (such as the remote management server 150). In some embodiments, the dock 140 includes a network bridge device that receives and converts RF signals from the robot 200 and relays them to the router 162 in a format supported by the router for delivery to the remote management server 150 or another device in the private network 160. In some embodiments, the dock 140 includes a low power mesh data network employing a mesh topology wherein RF communications signals are relayed from node to node between the mobile robot 200 and the dock 140. In this case, the connected devices 120, 122, 124, 126, 127, 128, 140 and range extender modules (if any; not shown) may serve as mesh nodes. Likewise, the mobile robot 200 may serve as a node to relay signals between the dock 140 and the other nodes (such as network enabled sensor devices 120, 122, 124, 126, 127, 128, 140 and range extenders).

Figure 3:
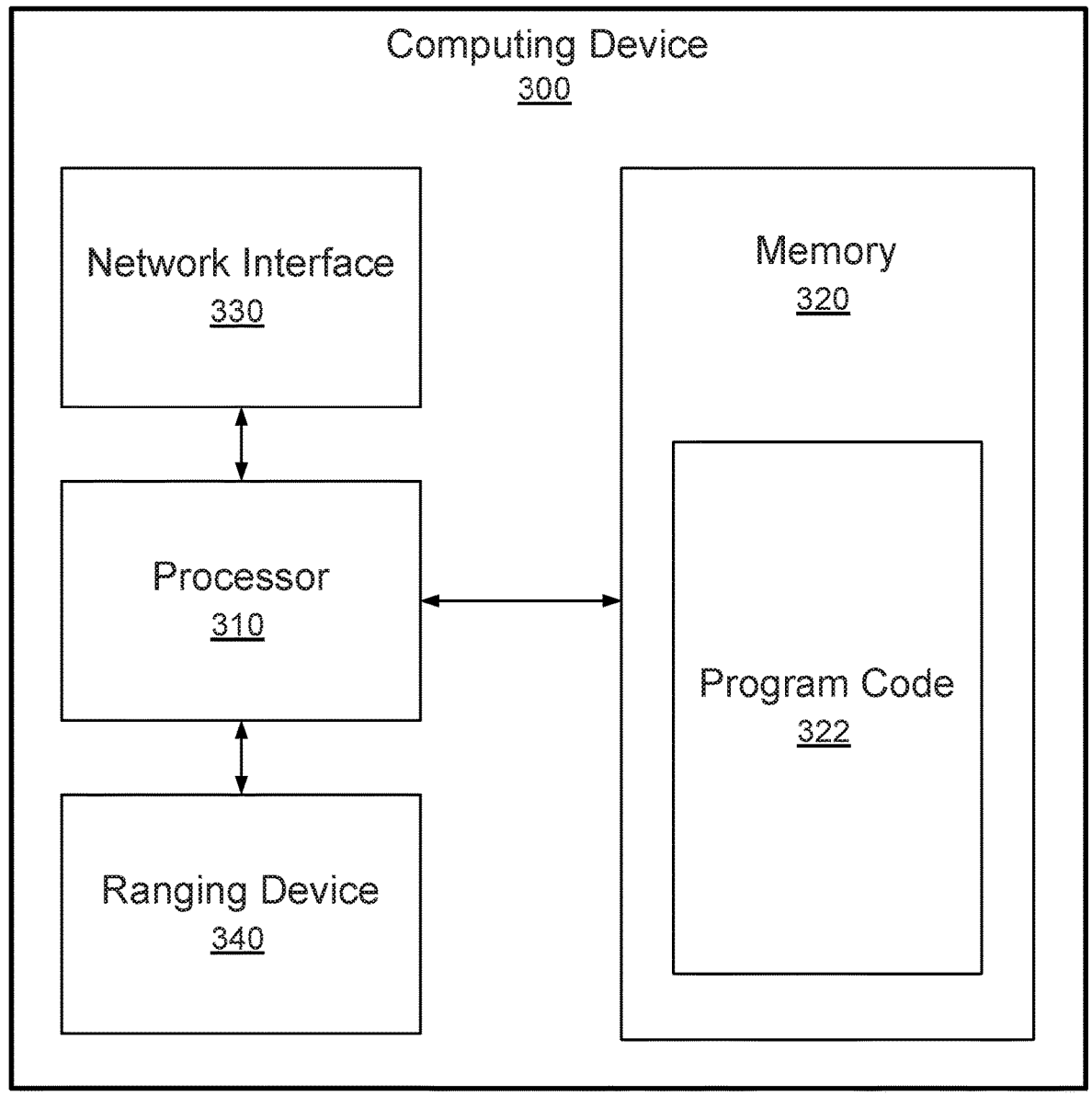
FIG. 3 is a schematic diagram representing a computing device according to embodiments of the present disclosure, which is configured to operate in the system of FIG. 1A.

The ranging device 276 includes a ranging sensor that can communicate with corresponding ranging sensors of respective connected devices (e.g., ranging device 340 of connected computing device 300 of FIG. 3). The ranging device 276 is configured to receive a signal from a corresponding ranging device and determine a distance between the ranging device and the corresponding ranging device. The distance approximates the distance between the mobile robot 200 and the connected device. The ranging device 276 can include a Radio Frequency (RF) transceiver configured to transmit and receive RF signals to/from the corresponding ranging devices of the respective connected devices. The ranging device 276 determines a distance to a corresponding device using Time of Flight (TOF) measurements, Received Signal Strength (RSS) measurements, angle of arrival (AoA) measurements, or a combination thereof. The ranging device 276 provides a signal to the mobile robot 200 indicative of an identity (e.g., a device identifier) and range to a corresponding connected device. In some aspects, the ranging device 276 can include a timestamp indicative of when the signal was received from the corresponding ranging device. The ranging device can include a ranging board and sensor manufactured by Locix, Inc. The ranging device can include one or more of a processor, transceiver, and data storage for locally receiving, processing, and storing data. The ranging device 276 is in communication with the one or more processing devices of the mobile robot 200.

The ranging device 276 is configured to automatically interface with the corresponding ranging devices of respective connected devices nearby (e.g., in the same room, operating environment, etc.). The ranging device 276 receives signals that are periodically transmitted from the connected devices (e.g., broadcast from the connected devices). When the mobile robot 200 receives a signal from a connected device, the mobile robot stores the measured distance to the respective connected device, the connected device identifier associated with the signal, and the current pose of the mobile robot. These data are used for determining the location of the connected device in the operating environment, as described in further detail with respect to FIG. 5.

In some implementations, the ranging device 276 uses non-RF signals and techniques for determine ranges between two devices. The ranging device 276 can include a visual signal. The mobile robot 200, with a camera or similar sensor, visually recognizes and localizes connected devices having a corresponding visual signal. Predetermined data, such as the actual size of the connected device and data indicative of profiles of the devices from different known locations and positions can be used as a set of calibration images for estimation of the range between the mobile robot and the connected device. The mobile robot 200 can receive a visual signal from a connected device, such as a visual beacon (e.g., LED) that blinks a particular color or in a particular pattern that is known and detected by the mobile robot. By observing the visual signal from multiple locations, the mobile robot 200 can estimate the position of the connected device. Alternatively or in addition, the connected device can include a visual tag (e.g., a calibrated barcode-like tag such as AprilTag or a QR Code). When the mobile robot 200 observes the visual tag, the mobile robot 200 can determine a distance and angle to the tag and therefore to the connected device based on known properties of the visual tag. In another example, the mobile robot 200 toggles operation of a connected device (e.g., switching a light bulb on and off). The mobile robot 200 detects corresponding changes to the operational environment (e.g., illumination changes with a camera to localize that particular light bulb). Alternatively or in addition, the mobile robot 200 includes a microphone array. The connected device emits an audio signal (e.g., a known pattern of chirps, beeps, or other sounds) that the mobile robot detects. The mobile robot 200 can localize the connected device over several instances of detecting the direction from which the sound is emanating. In some implementations, UWB ranging solutions (e.g., provided by Decawave, Time Domain, etc.) can be used for determining range data.

Figure 10:
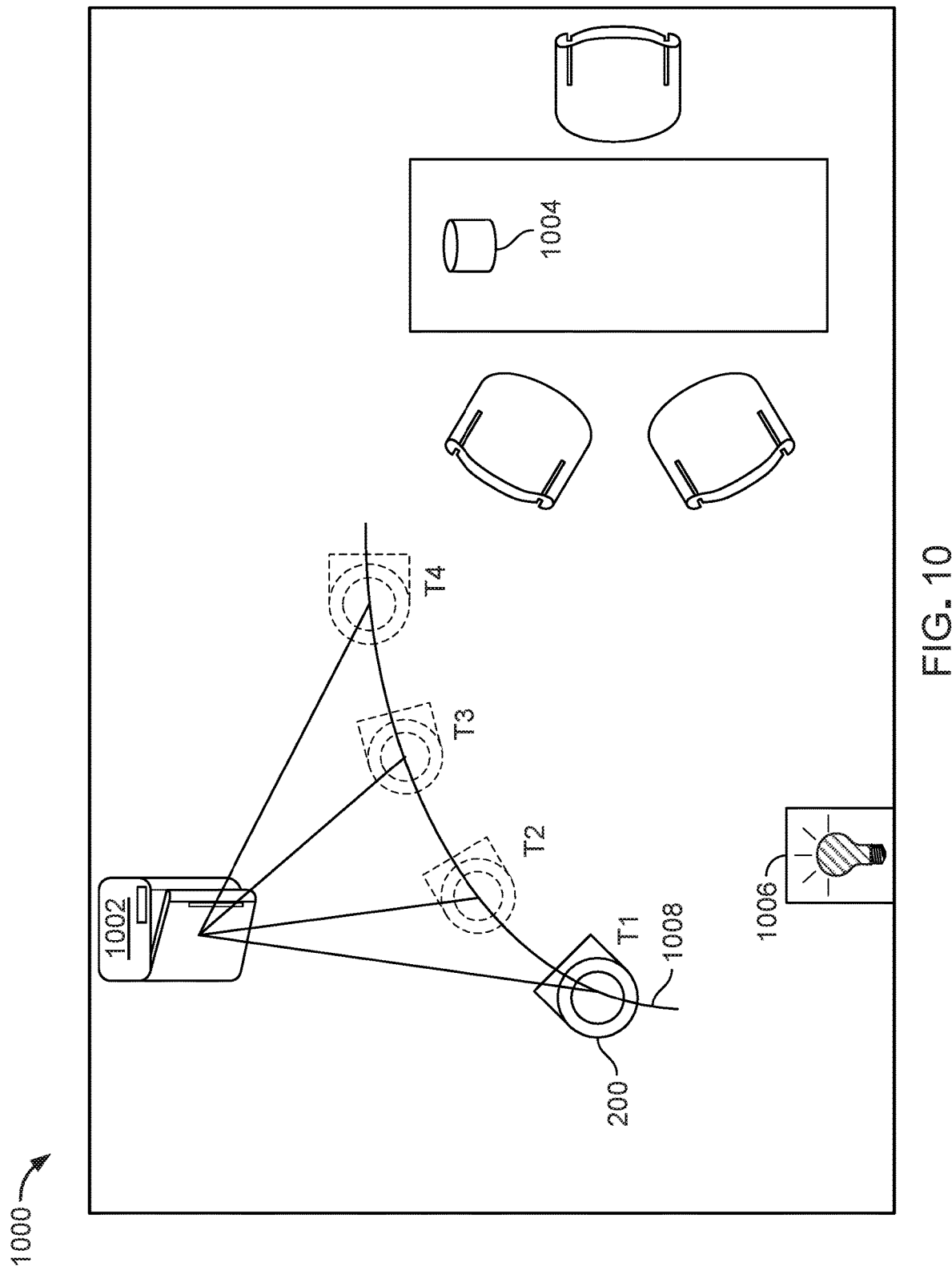
FIG. 10 is a diagram illustrating the mobile robot of FIGS. 2A-2C mapping locations of connected devices in an environment of the mobile robot.

While signals directly optimized to deliver accurate range information (e.g., UWB) can be used, other less accurate signals can be used to infer range (e.g., WiFi signal strength, audio, visual, etc.) that are inherently less accurate. By taking multiple readings by the mobile robot 200 while moving, a trajectory can be determined which optimizes the range information collected, and a precise location of the connected device can be determined. For example, as shown in FIG. 10, the mobile robot 200 can take readings at positions T1, T2, T3, and T4 in environment 1000. The multiple readings can be processed together to more accurately estimate the positions of connected devices 1002, 1004, and 1006. The mobile robot 200 knows the trajectory 1008 of traversal of the mobile robot, which can be used to provide additional context to received measurements at T1, T2, T3, and T4.

Referring to FIG. 3, the connected computing device 300 may be any suitable computing device(s), computer server(s) or cloud service(s), or a combination thereof, and it will be appreciated that not all of the components, features and functionality described herein are required in computing device(s) according to embodiments of the present disclosure. The computing device 300 includes one or more network interfaces 330, processor circuitry ("processor") 310, and memory 320 containing program code 322. The network interface 330 may include one or more network transmitters/receivers/transceivers configured to communicate through one or more wired and/or wireless networks with any associated available server(s) and/or data repositories. The processor 310 may include one or more data processing circuits, such as a general purpose and/or special purpose processor (such as a microprocessor and/or digital signal processor) that may be collocated or distributed across one or more networks. The processor 310 is configured to execute program code 322 in the memory 320, described below as a computer readable storage medium, to perform some or all of the operations and methods that are described above for one or more of the embodiments. The memory 320 is representative of the one or more memory devices containing the software and data used for facilitating operations in accordance with some embodiments of the present disclosure. The memory 320 may include, but is not limited to, the following types of devices: cache, ROM, PROM, EPROM, EEPROM, flash, SRAM, and DRAM.

The computing device 300 of FIG. 3 thus illustrates hardware/software architectures that may be used in generating visual status indicators for and/or controlling connected devices in the operating environment according to some embodiments described herein. However, it will be understood that embodiments of the present disclosure are not limited to such a configuration but are intended to encompass any configuration capable of carrying out operations described herein. The computing device 300 may thus more generally represent any device or network of devices having the capability to receive, process, enhance, store and transmit data or commands to and from one or more connected devices 30A, 34/34A, 36, 40, 120, 122, 124, 126, 127, 128, 140, 142, 144, 200 in service, using any appropriate combination of relevant methods and technologies. The computing device 300 may also provide additional processing to support other clients with different needs than the robot 200, such as visualizations and other rich UI interactions for presentation on user terminals 142, 144. In some embodiments, the functions assigned herein to the computing device 300 may also be performed wholly or in part locally on the robot, or in concert/coordination with a group of robots and/or servers or other computing devices in communication.

The ranging device 340 includes a corresponding ranging sensor that interfaces with and is similar to (e.g., identical to) the ranging device 276 described above in relation to FIG. 2. The ranging device 340 communicates with the ranging device 276 of the mobile robot 200 and with one or more ranging devices of other connected devices. The ranging device 340 can provide data to the connected computing device 300 that indicates ranges to the mobile robot 200 and to other connected computing devices. In some implementations, the connected computing device 300 is configured to transmit the measured ranges between the connected computing device and other connected devices to the mobile robot 200 in addition to the distance between the connected computing device 300 and the mobile robot. The ranging device 340 of the connected computing device 300 can be configured to act as a beacon and periodically transmit data locally (e.g., wirelessly to the operating environment) in order to detect and interface with ranging devices of other connected devices. For example, the ranging device 276 of the mobile robot 200 is configured to detect the beacon signal and determine a range the connected computing devices that transmits (e.g., beacons) the signal. Once the signal is received, the ranging device 276 of the mobile robot 200 handshakes with the ranging device 340 and ranging data are exchanged.

A handshake between the ranging device 276 on the mobile robot 200 and the ranging device 340 can be handled by the ranging device 276 itself without input from the mobile robot. In some implementations, ranging data from the ranging devices 276, 340 can be sent to a remote device (e.g., to a cloud server, etc.) such that the ranging devices 276, 240 do not directly exchange range data. In this example, the ranging devices 276, 340 exchange a lesser amount of data that is configured to be further processed by the remote device, the mobile robot 200, or other device to ultimately determine the range data.

Figure 4:
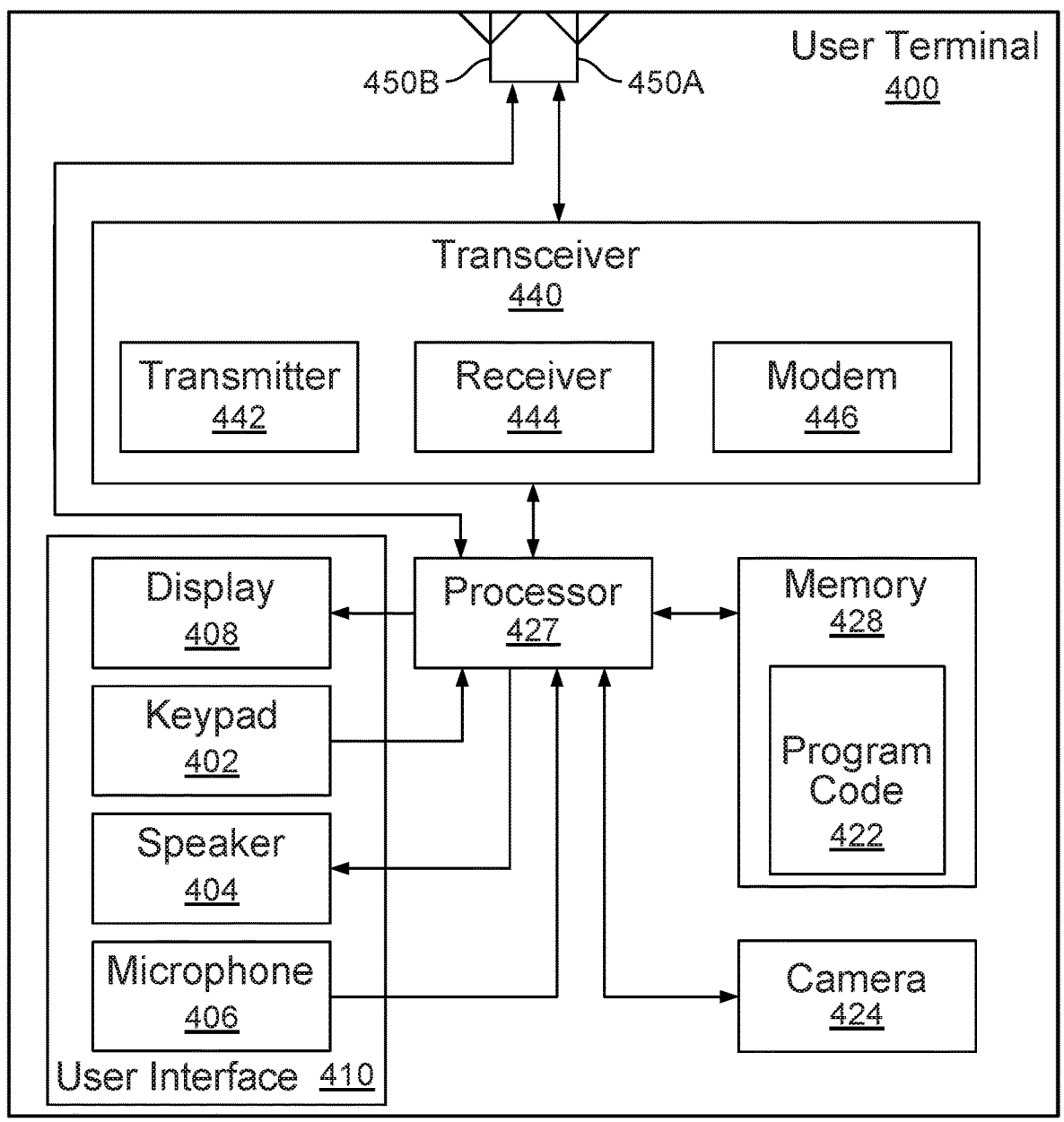
FIG. 4 is a schematic diagram representing a user terminal according to embodiments of the present disclosure, which is configured to operate in the system of FIG. 1A.

The user terminals 142, 144 of FIG. 1A may be any suitable stationary or mobile computing device(s) (including desktop computers, laptop computers, and "smartphones") and it will be appreciated that not all of the components, features and functionality described herein are required in user terminals according to embodiments of the present disclosure, and may be more generally represented by the user terminal 400 of FIG. 4. With reference to the example of FIG. 4, the user terminal 400 is configured to transmit and/or receive communication signals over multiple wired and/or wireless communication interfaces. For example, a transceiver 440 of the user terminal 400 according to some embodiments can include a cellular communication module, an infrared (IR) communication module, a global positioning system (GPS) module, a WLAN module, a wireless personal area network (WPAN) module, such as a Bluetooth, Wi-Fi, ZigBee, and/or Z-wave module, and/or other types of communication modules.

A user interface 410 of the user terminal 400 includes a display 408, such as a liquid crystal display (LCD) and/or an organic light emitting diode (OLED) display. The user interface 410 may optionally include a keypad 402 or other user input mechanism on the housing of the user terminal 400. In some embodiments, the display 408 may be provided with touch screen capability to replace and/or supplement the keypad 402. The user interface 410 may further include a microphone 406 and an earphone/speaker 404. The housing may be designed to form an acoustic seal to the user's ear when the earphone/speaker 404 is placed against the user's head.

The keypad 402, display 408, microphone 406, speaker 404 and camera 424 may be coupled to a processor 427, such as a microprocessor or microcontroller, which may be configured to control operations of the user terminal 400. The user terminal 400 may further include a transceiver 440 and a memory 428 coupled to the processor 427. Other electronic circuitry, such as a WLAN communication interface, a Bluetooth interface, a GPS interface, a digital signal processor, etc., may also be included in the electronic circuitry of the user terminal 400.

The memory 428 may be a general purpose memory that is used to store both program instructions 422 for the processor 427 as well as data, such as audio data, video data, configuration data, and/or other data that may be accessed and/or used by the processor 427. The memory 428 may include a nonvolatile read/write memory, a read-only memory and/or a volatile read/write memory. In particular, the memory 428 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored.

The transceiver 440 includes a transmitter circuit 442, a receiver circuit 444, and a modem 446, which cooperate to transmit and receive radio frequency signals to remote transceivers via an antenna array 450A, 450B. The radio frequency signals transmitted between the user terminal 400 and the remote transceivers may include both traffic and control signals (for example, paging signals/messages for incoming calls), which are used to establish and maintain communication with another party or destination. More particularly, the transceiver 440, in cooperation with the processor 427, may be configured for communication according to multiple radio access and/or wireless networking technologies, including (but not limited to) cellular, WLAN (including 802.11), WiMAX (Worldwide Interoperability for Microwave Access), Wi-Fi, Bluetooth, ZigBee, and/or Z-wave. Other radio access technologies and/or frequency bands can also be used in embodiments according to the present disclosure.

With reference again to FIG. 2C, the mobile robot 200 may include a localizer, implemented in hardware, software, or a combination thereof, that builds a metric, range-based map of walls and obstacles (using, for example, a laser range finder, sonar, radar, triangulation, time-of-flight, or phase difference calculating) and/or an occupancy map of free space (for example, traversable floor space, or floor space not occupied by an object or fixture). The mobile robot 200 can localize the robot on the map(s) using techniques such as scan matching, ICP (iterative closest point), and/or RANSAC (RANdom Sample consensus). Additionally or alternatively, the mobile robot 200 may include a localizing circuit that builds a fingerprinted, feature-based constellation or topological map of features, landmarks, fiducials and/or beacons (using, for example, a camera or point cloud generating 3D scanner, together with a feature transform to identify, store, and recognize natural or artificial keypoints, features, and/or landmarks) within an occupancy map of free space, and can localize the robot on this occupancy map using techniques such as VSLAM (vision-based/visual simultaneous localization and mapping). The data collected by the localizer of the mobile robot 200 based on navigation of an environment is generally referred to herein as occupancy data for the environment. A unique identity for unique rooms or areas (illustrated as Zone 1, Zone 2, Zone 3) may be associated by an end user with a household room-type or unique room label ("Living Room") via the user interface of any of the network entities, or may be automatically determined by recognition of landmarks or devices therein. The occupancy data (which may be visually represented as a "global map" for the operating environment) may include data defining multiple surface locations of the environment 10 (for example, by pixels), each having a value that corresponds to whether the pixel location corresponds to a surface location that is occupied, traversable by the mobile robot 200, or unexplored.

The localizing circuit may be defined by inputs from one or more of the sensors 270A-270H and ranging device 276 of the mobile robot 200, which may be used by the controller 220 to perform localization in the operating environment 10. More particularly, one or more of the localizing sensors 270A-270H and ranging device 276 are configured to detect sensor readings from objects located in the operating environment 10, and the controller 220 is configured to determine a current pose (a "pose" includes an absolute or relative location and optionally an absolute or relative orientation) of the mobile robot 200 with reference to the observed objects ("objects" not only including physical objects including observable features, as well as surface "objects" formed of optically or otherwise detectable surface characteristics such as corners, lines, patterns) based on the localization data detected by the localizing sensors 270A-270H and ranging device 276. Poses for objects may be determined as well. The mobile robot 200 may be further configured to associate a robot pose (e.g., location, orientation, etc.) with a room identifier specifically associated with the observed objects or their poses stationed in the room or observable upon the room's components (walls, ceiling, lighting, doorway, furniture), as indicated by the occupancy map. The use of ranging data from the ranging device 276 for determining the pose of the mobile robot 200 is described in further detail below in relation to FIG. 7.

Figure 5:
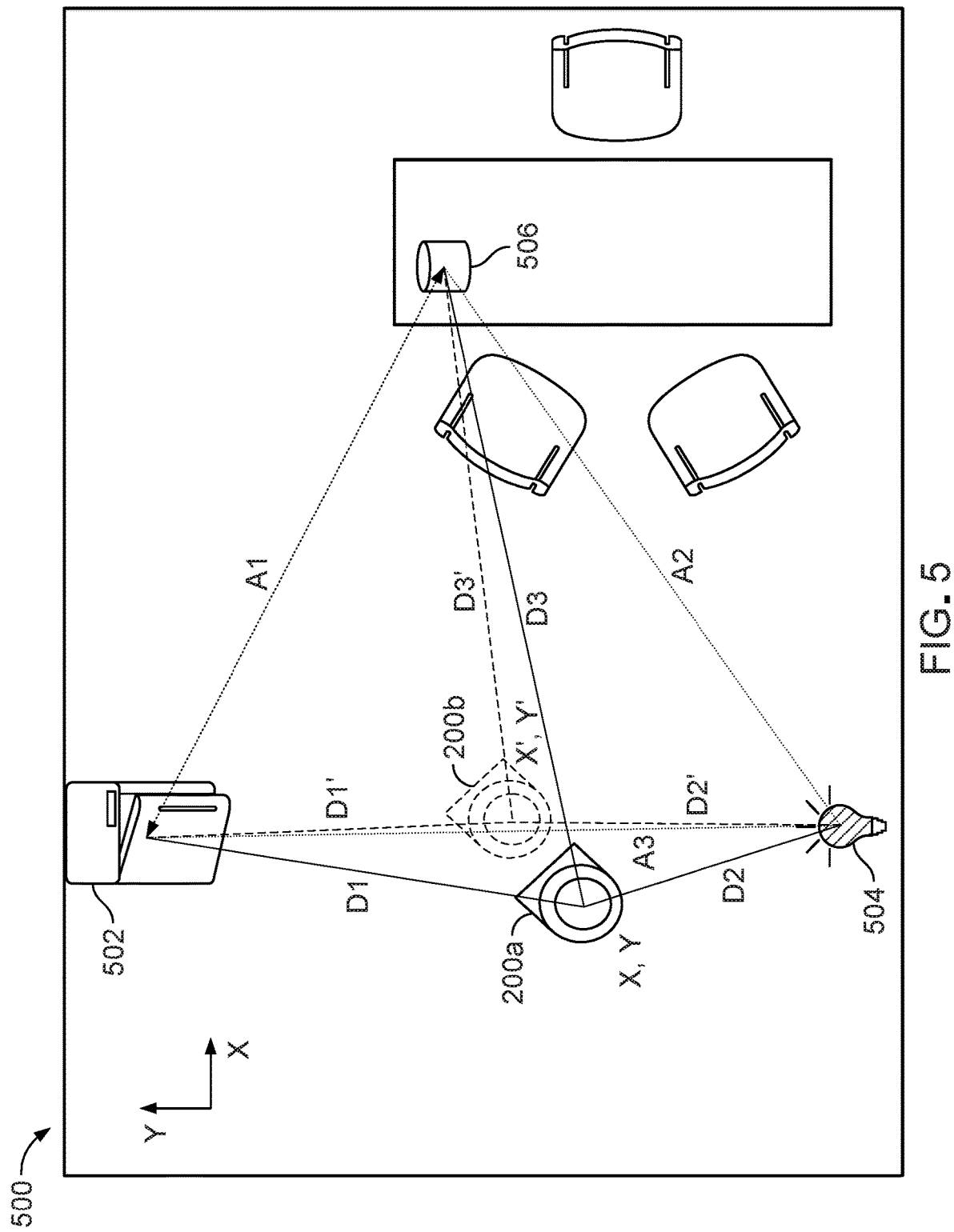
FIG. 5 is a diagram illustrating the mobile robot of FIGS. 2A-2C mapping locations of connected devices in an environment of the mobile robot.

Turning to FIG. 5, an operational environment 500 is shown in which the mobile robot 200 navigates. The mobile robot 200 is configured to determine the spatial locations of the one or more connected devices 502, 504, 506 of the operational environment 500. In this example, the operational environment 500 includes a single room, but the operational environment may include several rooms. The mobile robot 200 navigates the operational environment 500, as described above, and builds a map using occupancy data that is collected from the localizing sensors 270A-270H. The mobile robot 200 determines that its pose in the operational environment 500 at a first time is (X, Y). The pose determined by the robot 200 refers to the position (and optionally the orientation) of the mobile robot with respect to a global coordinate system (also called a global map or absolute map). The coordinates of (X, Y) refer to the position of the mobile robot 200 in the global map as determined by the mobile robot (e.g., using VSLAM techniques as described above).

The mobile robot 200 and the connected devices 502, 504, 506 are nodes that form a network in the operational environment 500. The mobile robot 200 moves in the operational environment 500 and can be tagged as a dynamic node. The connected devices 502, 504, 506 are generally stationary in the operational environment 500 and can be tagged as static nodes by the mobile robot 200 and by each other. The static nodes generally have fixed distances between them that are known to the network, illustrated as distances A1, between connected devices 502 and 504, A2 between connected devices 504 and 506, and A3 between connected devices 506 and 502, respectively. Distances A1, A2, and A3 can be sent to the mobile robot 200 (e.g., in response to a query, intermittently, etc.). The distances A1, A2, A3 can be used by the mobile robot 200 to determine the positions of the connected devices in the operational environment 500.

In some aspects, one or more of the devices 502, 504, 506 are not static and are not tagged as static nodes. For example, if the mobile robot 200 determines that one of the connected devices 502, 504, 506 has moved with respect to the other connected devices of the operational environment 500, the mobile robot 200 can tag the appropriate device as another dynamic node. Tagging the connected device as a dynamic node removes an assumption that one or more of distances A1, A2, A3 between that connected device and other connected devices in the operational environment 500 are static, which can change how the mobile robot 200 estimates the positions of the connected devices in the operational environment.

At position (X, Y), the mobile robot (represented as mobile robot 200a) receives data from each of the connected devices 502, 504, 506. In the present example, device 506 is a virtual assistant, device 502 is a refrigerator, and device 504 is a light switch, and all three connected devices are static (and distances A1, A2, and A3 do not change). The mobile robot 200a receives a range to each of the devices: range D1 to device 502, range D2 to device 504, and range D3 to device 506.

Ranges A1, A2, A3, D1, D2, and D3 can be in any format supported by the ranging device 276 of the mobile robot and can be in any units. For example, the virtual assistant 506 may report that D3 is eight feet, 244 cm, and so forth. In some implementations, the reported range includes an error factor.

The mobile robot 200 receives data including ranges D1, D2, and D3, and their respective device identifiers, and tags each of the received data with the current pose (e.g., position) of the mobile robot 200 in the global map of the mobile robot, as shown in table 1, below:

TABLE 1

| Range Data at Position (X, Y) | | |
|---|---|---|
| Device ID | Range | Current Pose |
| 502 | D1 | (X, Y, Z°) |
| 504 | D2 | (X, Y, Z°) |
| 506 | D3 | (X, Y, Z°) |

In some aspects, the orientation (shown as Z° in Table 1) of the mobile robot 200 is also stored in addition to the position data to represent the pose of the mobile robot 200. The orientation can be used to determine the exact position of the ranging device 276 with respect to a center of the mobile robot 200, or other portion of the mobile robot that is used as a reference point to represent the position of the mobile robot in the global map. The orientation data of the determined pose of the mobile robot improves the accuracy of the estimated positions of the connected devices 502, 504, 506 in the operational environment 500 and assignment and display of coordinates to the connected devices in the global map.

The mobile robot performs an estimation of the spatial positions of the connected devices 502, 504, 506 in the operational environment 500 and plots the estimated positions on the global map, which can be displayed on a terminal device (e.g., device 400). The range data, which includes a relative location of each connected device 502, 504, 506 to the mobile robot 200, is transformed to absolute position data of each of the connected devices in the operational environment 500 with respect to the coordinates of the global map of the mobile robot 200. As stated above, the global map can be constructed by the mobile robot 200 from VSLAM (or other localization and mapping algorithm). The estimation is performed using the measured distances D1, D2, D3, and optionally (when available) the distances A1, A2, A3.

In cases where there is one connected device or other situations in which one or all of distances A1, A2, A3 either do not exist or are unavailable, the initial estimation of the positions of the devices 502, 504, 506 may have relatively large uncertainty values. In such cases, the mobile device 200 may refrain from displaying the estimated positions of the connected devices 502, 504, 506 on a display (e.g., as shown in relation to FIGS. 6A-6C, below) until the uncertainty value is smaller than a threshold. As the mobile robot 200 moves in the operational environment 500 and collects additional ranging data (e.g., D1', D2', D3'), the uncertainly value decreases.

The mobile robot 200 moves to position (X', Y') (illustrated as mobile robot 200b). The mobile robot 200 receives updated range data from each of the connected devices 502, 504, 506, which includes ranges D1', D2', and D3', respectively. The mobile robot 200 tags the updated range data with the updated pose of the mobile robot, generating another table similar to Table 1. The mobile robot 200 can update the estimations of the positions of the connected devices 502, 504, 506 in the global map using both the updated ranges D1', D2', D3' and the initial measured ranges D1, D2, D3. If available, A1, A2, and A3 can be used to further refine the estimated spatial positions of the connected devices 502, 504, 506.

In some implementations, the range data is logged by the mobile robot 200. Measurements from a given period of time are processed in batch using triangulation, SLAM and/or vSLAM, and other optimization approaches to jointly determine the range values from all collected measurements as part of one process. The range data can be stored either on a storage of the mobile robot 200 or remotely. Data from prior missions of the mobile robot 200 can be used to improve localization in the present instance. For example, the mobile robot 200 may log a number N of received measurements from each of the connected devices 502, 504, 506, and determine a vector of the mobile robot with respect to each connected device. Such batch processing can improve localization of the mobile robot 200 in contrast to a process in which the mobile robot determines a new estimated position in the global map for each connected device 502, 504, 506 after each iteration of range data are received.

Figure 6A:
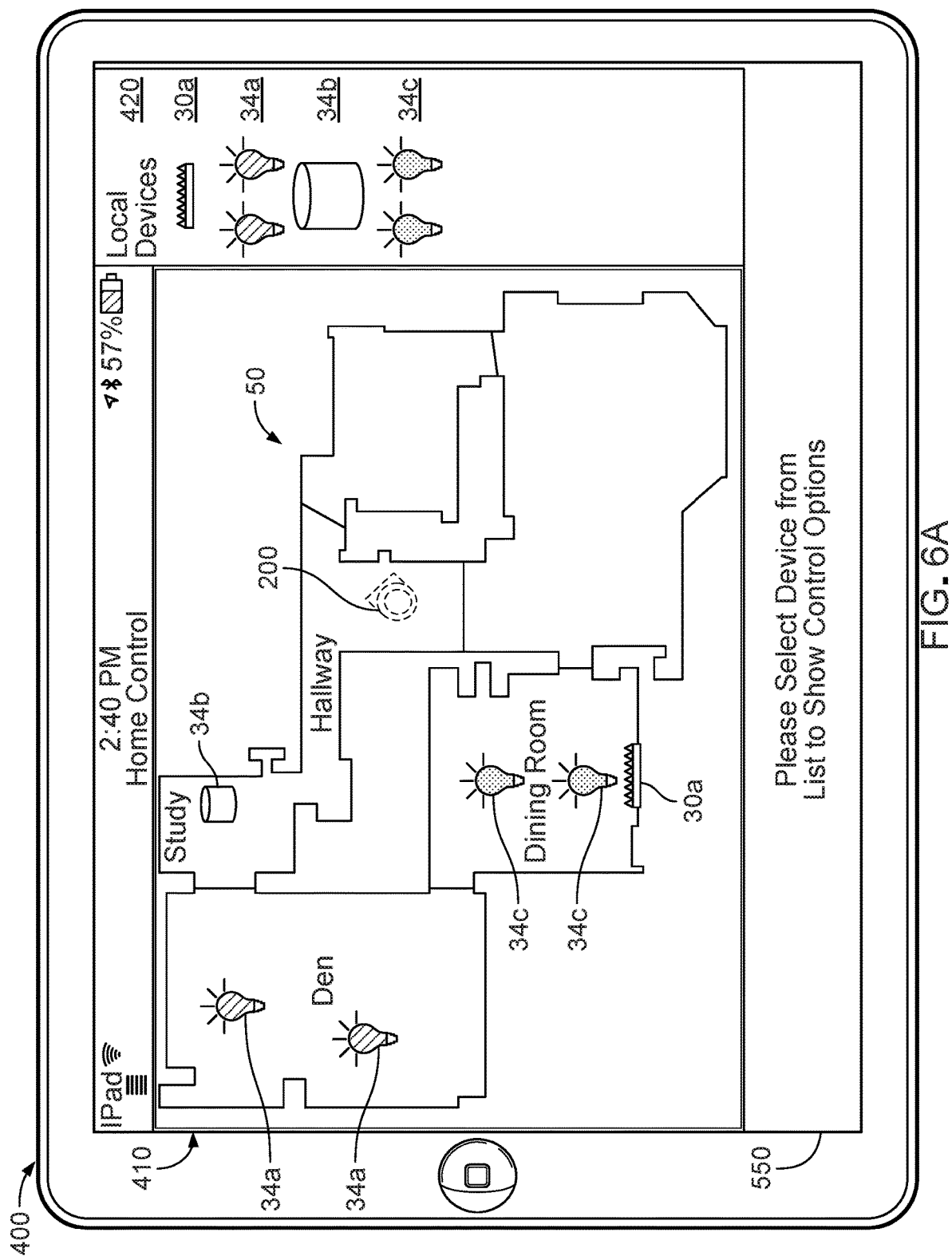
FIGS. 6A-6C are example user interfaces illustrating example operations for mapping, controlling, and displaying connected devices in a contiguous living space according to embodiments of the present disclosure.
Figure 6B:
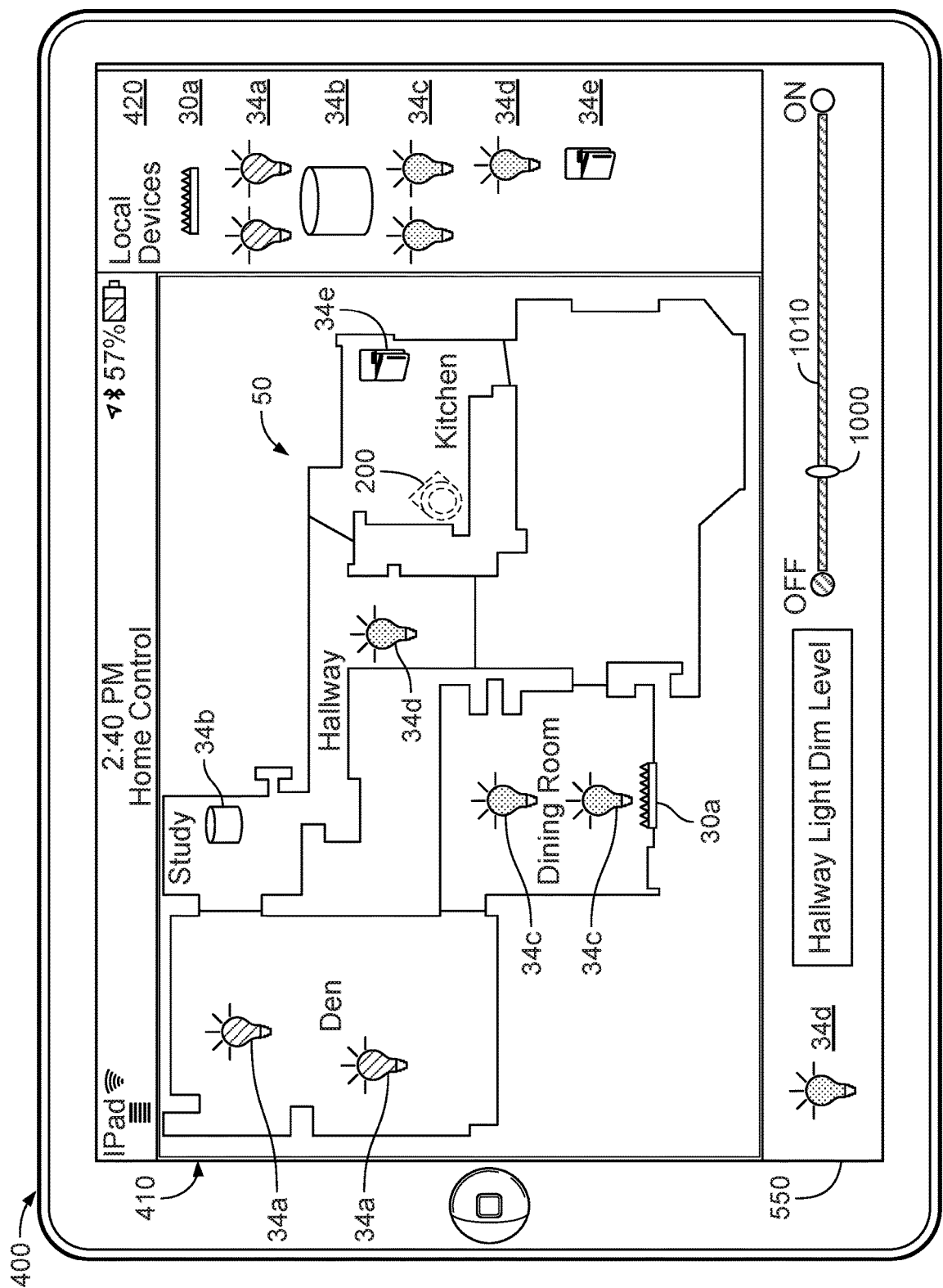
Figure 6C:
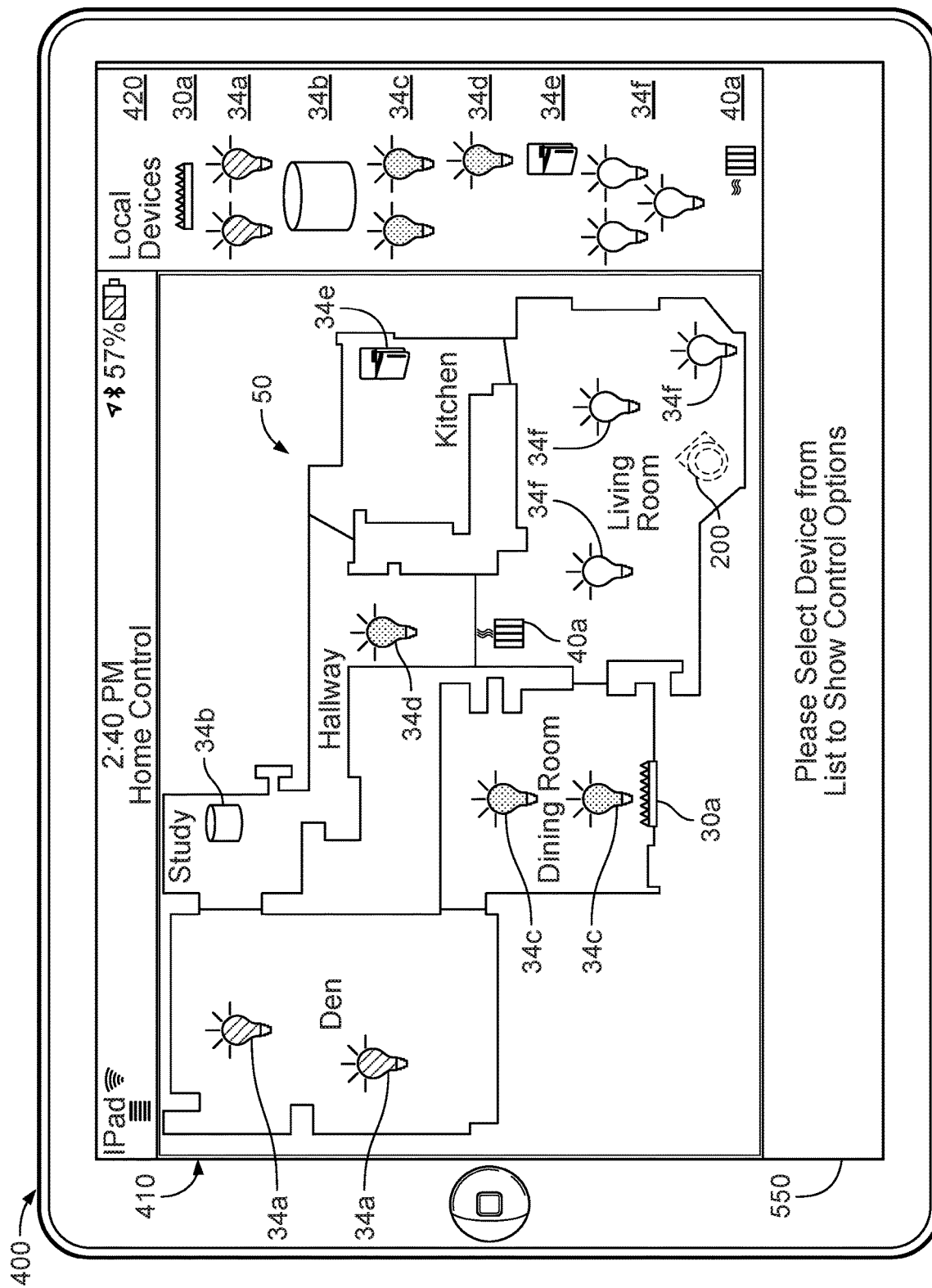

Turning to FIGS. 6A-6C, visual representations of the occupancy data collected by the localizer of the mobile robot 200 responsive to navigation of an operating environment may be displayed on a user terminal 400 to enhance awareness and/or control of the operating states of one or more of the electronic devices that are local to the operating environment, such as the connected devices 30A, 34/34A, 36, 40, 110, 120, 122, 124, 126, 127, 128, 140, 200 described with respect to FIGS. 6A-6C. FIG. 6A is a plan view of the user terminal 400 including an example user interface 410 configured to indicate operating status and/or control connected devices therein according to embodiments of the present disclosure.

With reference to FIG. 6A, the user interface 410 of the user terminal 400 is configured to display a visual representation 50 of the occupancy map, also referred to herein as a global map. The global map 50 indicates the relative locations or spatial context of one area or room of the operating environment to another (shown as a Den, Study, Hallway, Dining Room, Kitchen, and Living Room), for example, based on the presence or absence of physical boundaries between the areas as indicated by the occupancy data. The room name/type/label may be manually entered by a user, or may be automatically determined based on recognition of objects or connected devices therein. The global map 50 is populated with icons 30a, and 34a-34c representing connected devices (e.g., such as devices 502, 504, 506 of FIG. 5) that are within boundaries of or local to the operating environment. The placement of the icons 30a, and 34a-34c on the global map 50 indicate the respective spatial locations of the electronic devices relative to the rooms/areas as determined by the mobile robot 200 as described above in relation to FIG. 5. In some aspects, graphical characteristics of icons 30a and 34a-34c indicate the respective operating states of these electronic devices. The user interface 410 may also be configured to display a listing 420 of the devices that are local to the operating environment and a user input element 550 configured to receive a user-specified time for which operating state information is desired, as described in greater detail below.

While mapping, display, and control of connected devices 30a and 34a-f and 40a are shown in FIGS. 6A-6C, it will be understood that embodiments of the present disclosure are not so limited, but rather, may include displaying and/or controlling operation of other connected devices that are local to the operating environment 50, including but not limited to lights/light bulbs, door/window sensors, door locks, speakers, thermostat, environmental sensors (including but not limited to temperature, humidity, air quality, and illumination level sensors), window blinds, voice interface devices, monitoring cameras, etc.

The user interface 410 of FIGS. 6A-6C illustrates example visual representations of the operating environment that visually indicates relative spatial locations of devices and operational states thereof according to embodiments of the present disclosure. More particularly, FIGS. 6A-6C illustrate a scenario for an example user interface 410 of a user terminal (such as the user terminals 142, 144, 400) displaying a visual representation 50 of an operating environment (such as the living space 20 of FIGS. 1A-1B). The visual representation is illustrated as a global map 50, which is populated with icons 30a, 34a-34f, 40a indicating respective spatial locations and operating states of electronic devices in the operating environment.

In the example of FIG. 6A, the electronic devices represented by the icons 34a and 34c are connected light bulbs/fixtures (such as the light fixtures 34 and/or exhaustible lamps 34A of FIG. 1B), the electronic device represented by icon 34b is a smart assistant, and the electronic device represented by the icon 30a is a connected window blind (such as the window blind 30A of FIG. 1B). The populated global map 50 provides a visual "snapshot" of the operating environment, with the icons 30a, and 34a-34c indicating the locations and states of detected or user-specified devices. The user interface 510 can thus visually indicate positions of the devices represented by the icons 30a, and 34a-34c. In some aspects, the icons can indicate whether the displayed devices are operating and/or cooperating according to user expectations.

Referring to FIGS. 6A-6C, the global map 50 may be populated with the icons 30a, 34a-34c, 40a automatically (i.e., without human intervention) and/or responsive to user input via the user interface 410. For example, a user terminal executing an application that provides the user interface 410 may receive information identifying electronic devices in the operating environment (including both connected and non-connected devices) and/or their respective operating states from one or more network sources, including but not limited to the mobile robot 200, hub 110, controller 120, or other connected device. The list 420 identifying the local devices and/or operating states may thereby be generated.

Likewise, the respective spatial locations of the devices represented by the icons 30a, 34a-34f, 40a are determined automatically (for example, from occupancy data and/or wireless signal coverage data collected by the mobile robot) as described above in relation to FIG. 5.

The user interface 410 of FIGS. 6A-6C further includes a user input element 550 configured to receive a user specification of a command for operating one or more of the identified and displayed connected devices represented by the icons 30a, 34a-34f, and/or 40a is desired. In the example of FIG. 6B, the user input element 550 is illustrated as a dimmer-slider bar, which is configured to receive a user input that manipulates slider element 1000 to respective positions along a length of a bar element 1010. The bar element 1010 visually represents a range for which power can be delivered to element 34d. In some aspects, controls such as dials for a thermostat, commands for a smart assistant, etc. can be included in the input element 550.

The icons 30a, 34a-34f, 40a may visually represent or indicate operating state in any number of ways, including by shading, color, symbols, punctuation, and/or text. For example, as shown in FIG. 6C, the icons 34f representing the light bulbs/fixtures in the Living Room have solid pattern to indicate that these light bulbs/fixtures are on, while the icons 34a representing the light bulbs/fixtures in the Den are shaded to indicate that the light bulbs are off. The icons 34c, and 34d representing the light bulbs/fixtures in the Dining Room, Hallway, and Kitchen (all of which are spatially adjacent the Living Room) are speckled to indicate that the light bulbs/fixtures are dimmed. These visual indications are provided by way of example only, and it will be understood that other visual indications and/or text may be displayed by the user interface 410 to indicate the actual or expected/scheduled operating states of the devices represented by the icons 34a-34f responsive to a user command via the user input element 550.

The global map(s) described herein may be generated based on occupancy data detected by localizing sensors of a mobile robot (such as the sensors 270A-H of the mobile robot 200 of FIGS. 2A-2C) responsive to navigation of the operating environment. In some embodiments, the relative spatial locations of the local electronic devices may be determined based on the occupancy data and/or based on signal coverage data acquired by a wireless transceiver of the mobile robot (such as the wireless transceiver 252 of the mobile robot 200 of FIGS. 2A-2C). Operations for generating maps and determining spatial locations based on occupancy data and/or signal coverage data acquired by a mobile robot are further described in commonly-owned U.S. patent application Ser. No. 15/588,117 filed on May 5, 2017, the disclosure of which is incorporated by reference herein in its entirety.

The list 420 of electronic devices that are local to the operating environment may be generated based on information identifying the devices and/or operating states thereof received via the network 160 or 170. For example, devices and/or operating status may be identified by requesting information kept by gateways/hubs (such as the hub 110 of FIG. 1B) about the devices to which they are coupled. In a particular example, the hub 110 may include hardware/software for connection with and control over IoT devices from a consolidated user interface (for example, a SmartThings™ or Wink hub), and devices coupled to the SmartThings™ or Wink hub may be identified by interrogating the hub. In another example, a networked home energy monitoring device, such as a Sense home energy monitor, may automatically detect and identify devices and operating data (whether network-enabled or not) based on their power draw. Other operations for obtaining device identification may include (but are not limited to) performing a port scan to identify services exposed, pattern-matching against received responses, and/or interacting with discovered services to extract more structured information (for example, attributes that the device advertises through network 'discovery' protocols such as UPnP or mDNS). Additionally or alternatively, the information identifying the devices, the operating states thereof, and/or the spatial locations thereof may be received via the user interface, for example, by manual entry in the list of devices 420.

Connected computing device(s) as described herein may further be configured to transmit control signals to control operation of one or more electronic devices based on their respective spatial locations in the operating environment and the relative spatial context of the areas in which they are located. In some embodiments, the global map 50 may indicate the presence or absence of walls and/or obstacles dividing one area/room of the operating environment (and devices located in the area/room) from another. One or more of the connected devices can be associated with one another based on a spatial relationship between the connected devices (e.g., part of a designated area, within a threshold distance from one another, etc.). One or more connected devices that include a spatial association (e.g., designated by a user of the terminal device 400 or automatically by the mobile robot 200) can be controlled as a group (e.g., devices 34c of FIG. 6C).

FIGS. 6A-6C together show an example of a mission of the mobile robot 200 as it maneuvers through the operational environment 50. As the mobile robot 200 maneuvers through the operational environment 50, the mobile robot 200 discovers and localizes additional connected devices and populates a list of local devices 420. As described above, the local devices 420 of the list can be selected using the user interface 410 of the terminal device 400, and a command can be sent to the selected local device (e.g., by controls 550).

In FIG. 6A, the mobile robot 200 has navigated through the dining room, den, and study, and is currently in the hallway. Connected devices 30a, 34a-c have been discovered and the positions of the connected devices have been automatically added to the visualization presented in the user interface. The locations of the icons 30a, 34a-c represent the respective positions of the connected devices that have been determined by the mobile robot 200 and added to the global map that represents the operational environment 50.

In FIG. 6B, the mobile robot 200 has moved to the kitchen and discovered an additional connected device 34e. The mobile robot 200 can use the signals from the previously discovered connected devices represented by icons 30a, 34a-c to determine the position of the connected device represented by icon 34e. The device is added to the list of local devices 420. The user of the terminal device 400 can select a device (e.g., represented by icon 34d in the hallway) and a dimmer bar 1010 appears. The user can dim the light represented by icon 34d in the hallway, even while the mobile robot 200 is in the kitchen.

In FIG. 6C, the mobile robot 200 is in the living room and has discovered additional connected devices 34f and 40a. The mobile robot 200 can refine the determined positions of connected devices 30a, and 34a-e based on the data received from the newly discovered connected devices represented by icons 34f and 40a. For example, the mobile robot 200 can use the positions of each of the three lights of icons 34f to localize the position of the electronics 40a and of the refrigerator represented by icon 34e. Thus, in this example, the entire global map can be updated based on newly discovered devices, both by using stored range data of the connected devices and by using new readings of range data.

The capturing of ranges to individual connected devices and mapping of locations of the connected devices can be processed in the context of many missions performed by the mobile robot 200 (e.g., rather than merely a single run of the mobile robot 200). Over extended periods of time (e.g., over the operational lifetime of the mobile robot 200) the robot continues to collect such ranging information to refine connected device locations, identify when a connected device has moved and relocalize it, and use the known locations of connected devices to improve the localization of mobile robot 200 itself in the operational environment 50.

Connected computing device(s) as described herein may further be configured to transmit control signals to control operation of one or more connected electronic devices predictively, based on device operation and/or environmental conditions in adjacent areas of the operating environment. For example, in controlling motion-activated events, such as lighting, it may be desirable to control operation of a connected electronic device before (or as) a user enters a space, rather than after detecting the presence of the user in the space. Furthermore, electronic devices may be individually controlled differently responsive to detecting the same event, based on their relative spatial locations and/or the relative spatial context of the rooms in which they are located.

Further operations and advantages in accordance with embodiments of the present disclosure may include automatic generation and/or tailoring of automated rules for controlling connected devices responsive to associating devices with respective spatial locations in the operating environment. For example, in response determining the spatial locations of connected devices in the global map, one or more conditional instructions for operation of the device may be automatically generated based on the type of device, the type of room corresponding to or proximate the location, and/or the spatial context of the room relative to other rooms and/or devices in the operating environment. For instance, responsive to detecting a motion sensor type device with a room on the map, connected home rules may be automatically generated to turn lights on in that room when motion is detected. In another example, responsive to detecting that lighting devices in a Bedroom are off, a control signal to turn on the lighting devices in the Bedroom may not be transmitted responsive to detecting motion in an adjacent Hallway. The room type may be determined by receiving user input of a room name, or may be automatically detected based on determination that the objects are in the room and/or identification of electronic devices in the room. That is, conditional instructions for operating an electronic device may be automatically created based on the association of the device with a spatial location, and the device may be operated responsive to on occurrence of one or more conditions indicated by the conditional instructions. Conditional instructions for operating the electronic devices may also be automatically adjusted based on detection of the presence of one or more users in the operating environment, and/or based on their positions in the relative spatial context.

Embodiments of the present disclosure are not limited to representing spatial locations and status information for connected devices in the operating environment. For example, some embodiments can provide temporal status information based on device energy monitoring, even for non-connected devices that are local to the operating environment. In particular, energy usage of a non-connected device can be determined using networked energy monitoring devices, such as the Sense home energy monitor, which automatically detect and identifies unconnected device based on their power draw profile. For example, an air conditioning unit and a refrigerator in the operating environment can be uniquely identified based on their respective energy usage and power draw profiles. Operating status information and respective spatial locations for such non-connected devices may also be determined from energy usage and corresponding locations of power outlets. Spatial locations of such non-connected devices can further be visually recognized by a mobile robot during navigation of the operating environment. Thus, non-connected devices can be identified, added to the global map to indicate their respective spatial locations, and correlated with their energy usage information to provide visual indications of location and status in the operating environment as described herein.

Figure 7:
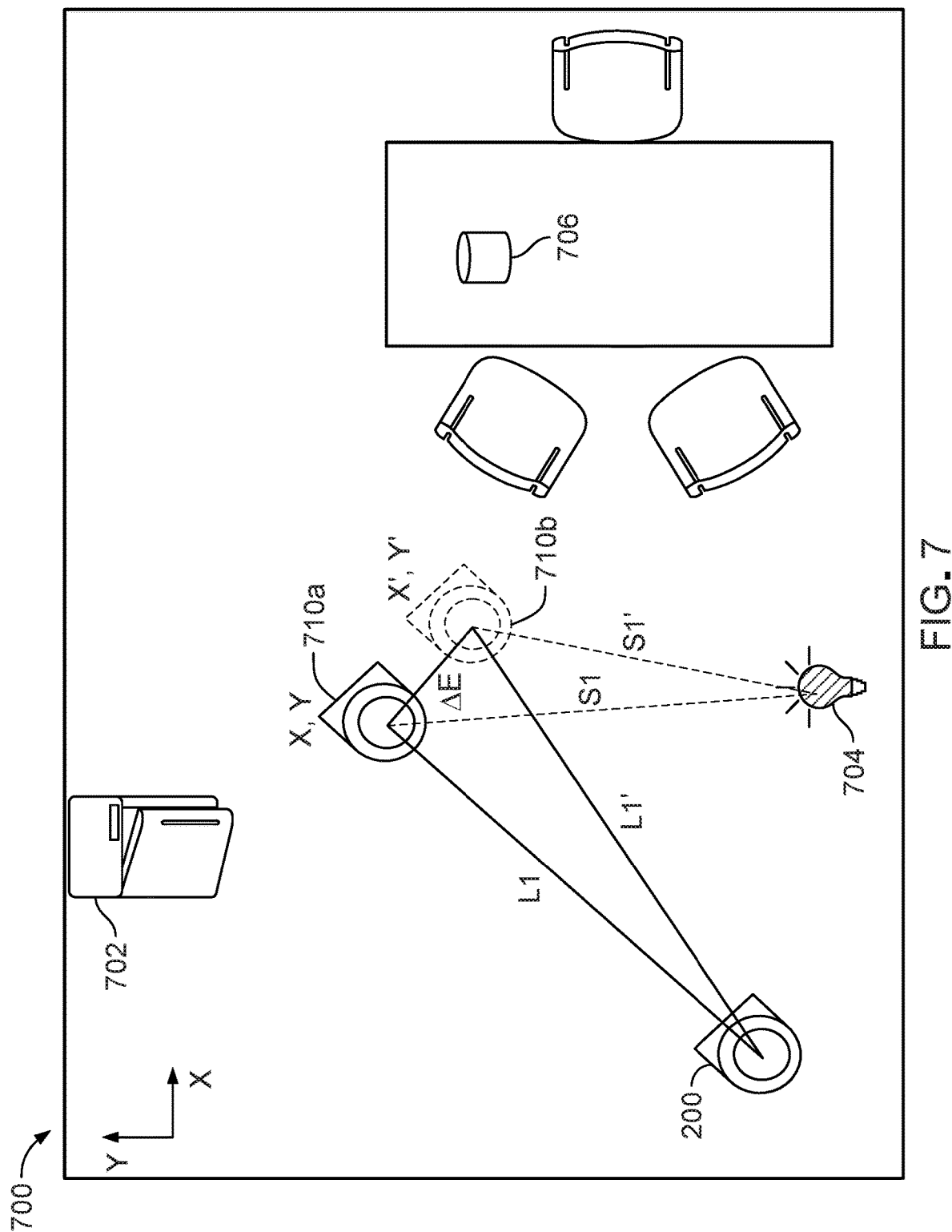
FIG. 7 is a diagram illustrating a localization of the mobile robot of FIGS. 2A-2C using connected devices in an environment of the mobile robot.

FIG. 7 shows an example operating environment 700 in which localization the mobile robot 200 is enhanced using ranging data received from one or more connected devices 702, 704, 706. As the mobile robot 200 navigates through the operational environment 700, the mobile robot generates a global map from occupancy data in a manner described in detail above. The mobile robot 200 can use range data received from each of connected devices 702, 704, 706 to localize the mobile robot in the global map.

Localization of the mobile robot 200 can be performed in conjunction with other localization techniques (e.g., vSLAM or laser SLAM). For example, visual data received by a camera of the mobile robot 200 can be used to identify landmarks and localize the mobile robot in the operational environment 700. In some implementations, data from one or more other sensors is also received for localizing the mobile robot 200 in the operational environment 700, such as obstacle detection devices (e.g., LiDAR, ultrasonic sensors, etc.), shaft encoders of the drive system of the mobile robot, and so forth. Slippage from shaft encoders, poor lighting for visual landmark identification, etc. can cause errors in estimation of the position of the mobile robot 200. The mobile robot 200 receives range data from one or more of connected devices 702, 704, and 706, and uses this additional data to verify accuracy of the estimated position of the mobile robot.

In the scenario shown in FIG. 7, the mobile robot 200 estimates its position in the global map as being (X, Y), shown by mobile robot marked 710a after traveling a measured distance of L1 in the global map. The mobile robot 200 receives ranging data from one or more of sensors 702, 704, and 706. In this example, the mobile robot 200 determines that the range to the connected light switch 704 is not the expected S1, but S1'. The mobile robot 200 uses the range data from the connected devices 702, 704, 706 to determine that a corrected position (X', Y') in the global map, marked as mobile robot 710b. The mobile robot 200 has actually traveled distance L1', but slippage of the wheels, poor lighting, etc. have caused errors in localization. The mobile robot 200 can periodically correct the global map (and the positions of obstacles, connected devices, etc. in the global map). For example, in FIG. 7, the mobile robot updates its estimated position in the operational environment 700 by a distance of ΔE.

In some aspects, the mobile robot 200 determines its position in the operations environment 700 entirely by range data received from the connected devices 702, 704, 706. The mobile robot 200 generates a global map of the operational environment 700 based on receiving and storing range data over a period of time. The mobile robot 200 updates the global map as new iterations of measurements are received from each of the connected devices 702, 704, 706. The range data can be used in combination with one or more other sensors (e.g., LiDAR, ultrasonic, bump switch, etc.) to generate the occupancy data from which the global map is generated. In some implementations, the range data is the only data used for determining the position of the mobile robot 200 in the global map. In some implementations, the mobile robot 200 marks each of the connected devices as landmarks for SLAM instead of landmarks that are identified using visual data. In some implementations, the mobile robot 200 uses WiFi ranging data (e.g., received signal strength data) to determine the position of the mobile robot in the global map using similar techniques as those described above.

Figure 8:
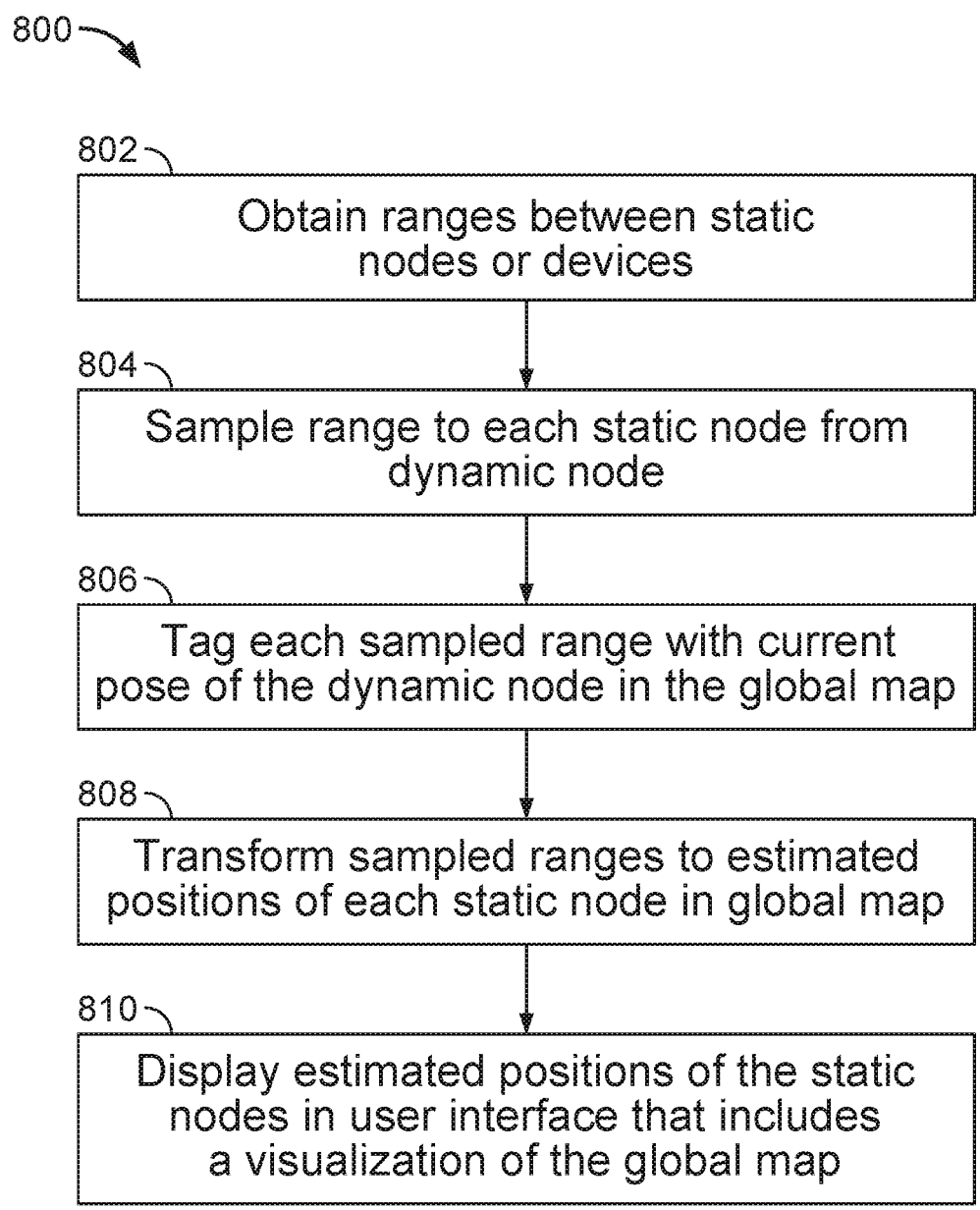
FIGS. 8-9 are flowcharts illustrating operations that may be performed by the mobile robot of FIGS. 2A-2C for mapping, controlling, and displaying connected devices in an environment of the mobile robot.
Figure 9:
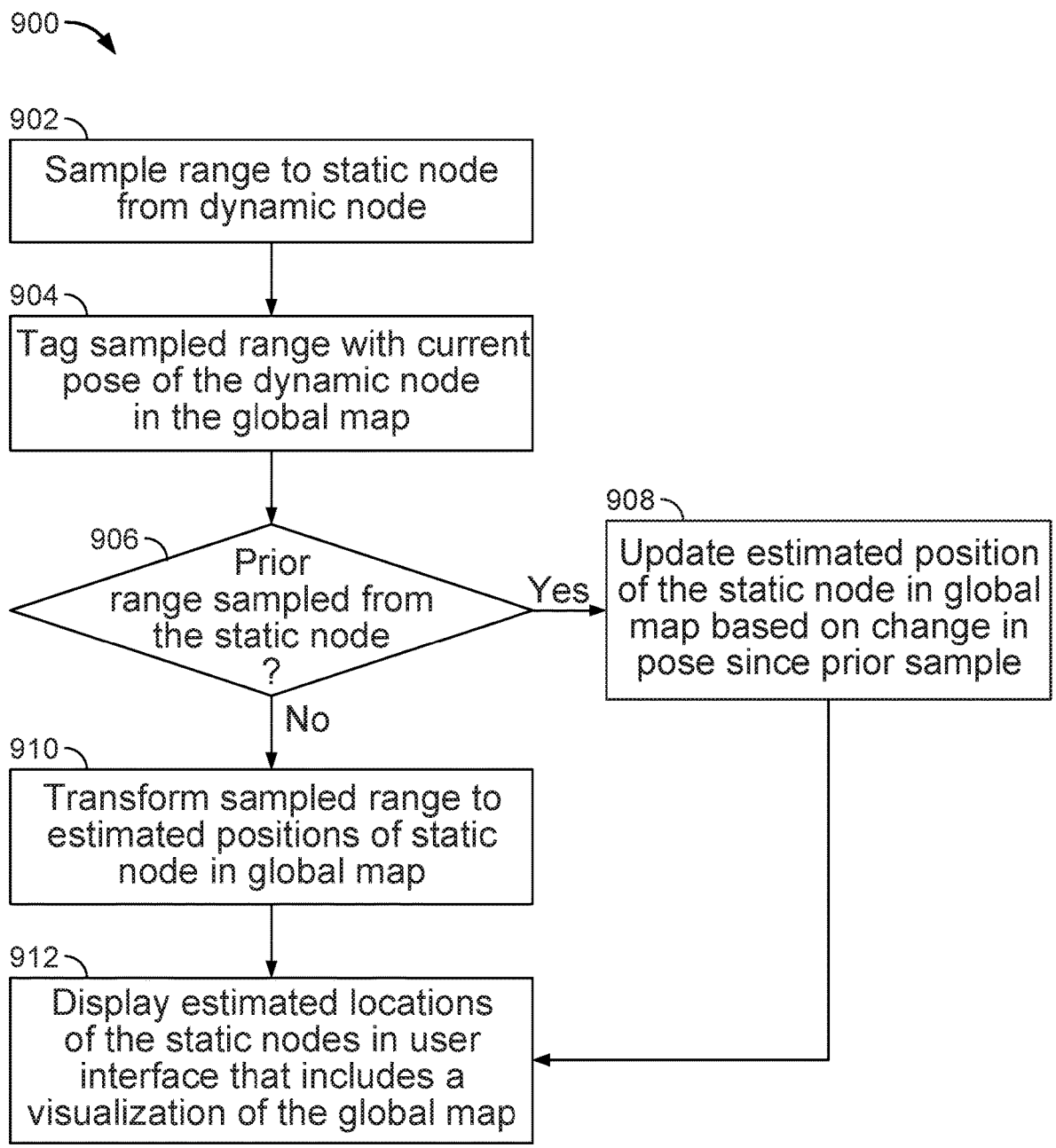

FIGS. 8-9 are flowcharts illustrating operations that may be performed by or responsive to instructions from at least one processor of a computing device in accordance with embodiments of the present disclosure. The operations of FIGS. 8-9 may represent executable routines or instructions stored in a non-transitory computer-readable medium, such as the memory devices 222, 320, 428 described herein, and may be executed by one or more processors, such as the processors 220, 310, and/or 427 described herein, to implement the specified routines or instructions.

FIG. 8 shows an example process 800 for determining the positions of one or more connected devices in an operational environment. The mobile robot obtains (802) ranges between static nodes (e.g., connected devices) as measured by the static devices. The mobile robot (also termed the dynamic node) samples (804) range data to each static node from the mobile robot. The range data are tagged (806) with the position of the mobile robot in the global map when the range data was sampled. The range data are transformed (808) from local ranges between the mobile robot and each of the connected devices to absolute positions for each of the connected devices on the global map. In this case, the current pose of the mobile robot, which can include both position and orientation data, are used as origin coordinates for the sampled range data. The range data can be used to find the position of the connected device with respect to the position of the robot in the global map. The estimated positions of the static nodes are displayed (810) in a user interface that includes a visualization of the global map (e.g., operational environment) of the mobile robot. The position of the mobile robot in the global map can also be displayed.

FIG. 9 includes an example of a process 900 for determining the positions of one or more connected devices in an operational environment. The mobile robot (also termed the dynamic node) samples (902) range data to a static node. The range data are tagged (904) with the position of the mobile robot in the global map when the range data was sampled. A determination (906) is made of whether ranging data have been stored, such as from other connected devices, and whether positions of other connected devices have been estimated. If ranging data and prior estimated positions of connected devices exist in the global map, the estimations of the positions can be updated (908) based on the change in the pose of the mobile robot (and the collection of additional range data). If there are no connected devices positions or ranging data being stored, the range data are transformed (910) from local ranges between the mobile robot and each of the connected devices to absolute positions for each of the connected devices on the global map. In this case, the current pose of the mobile robot, which can include both position and orientation data, are used as origin coordinates for the sampled range data. The range data can be used to find the position of the connected device with respect to the position of the robot in the global map. The estimated positions of the static nodes are displayed (912) in a user interface that includes a visualization of the global map (e.g., operational environment) of the mobile robot. The position of the mobile robot in the global map can also be displayed.

Electronic devices in the operating environment are associated with respective spatial locations of the operating environment based on the occupancy data. As noted above, the spatial locations of the electronic devices may be determined from the occupancy data and/or from wireless signal coverage data collected by the mobile robot responsive to navigation of the operating environment, and/or from user input received via the user interface. In addition, the occupancy data may be indicative of rooms in the operating environment, for example, based on an absence or presence of physical boundaries between the areas of the operating environment encountered by the mobile robot during navigation. A relevant spatial context of the rooms in the operating environment may be further identified based on the occupancy data, and electronic devices may thereby be segmented or grouped into respective subsets based on the respective spatial locations thereof in light of the relative spatial context of the rooms in the operating environment. For example, electronic devices in/near a same room, or within/near boundaries of contiguous rooms, may be grouped into the same subset, while electronic devices outside of the boundaries of a room or of contiguous rooms may be grouped into a different subset.

A control signal can be transmitted to one or more of the electronic devices to control operation thereof based on their respective spatial locations (and/or based on the relative spatial context of the rooms corresponding to the respective spatial locations). For instance, control signals may be transmitted to one or more of the electronic devices according to their corresponding grouping or subsets in a common room or contiguous space. In a particular example, lighting devices spatially located in contiguous areas of an operating environment may be similarly controlled based on their grouping in a common subset, despite being physically located in different rooms. Also, the control signal may be transmitted to one or more electronic devices based on the type of room corresponding to their respective spatial locations, and/or device activity and/or environmental conditions in an area of the operating environment adjacent their respective spatial locations.

That is, as described herein, electronic devices may be differently controlled based on their respective spatial locations in the operating environment, the relative spatial context of the rooms corresponding to their respective spatial locations, and/or operating conditions in adjacent areas of the operating environment (including operating states of other electronic devices and/or environmental conditions). Data indicating the actual operation of electronic devices may also be logged and stored in a database along with data indicating expected or scheduled operation of the electronic devices, for use in generating and displaying temporal status information whereby the operating status for the electronic devices can be presented at user-selectable points in time. Thus, based on occupancy data collected by a mobile robot during navigation of an operating environment, a user interface may be generated that provides a visual representation of device locations and past/present/future operating states of the devices, and also allows for control of current or future operating states of the electronic devices.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a hard disk drive, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

A computer readable signal medium may include a propagated data signal with computer readable information embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable information embodied on a computer readable signal medium (for example, as program code) may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on a user terminal, a mobile robot, or a remote server described herein, or partly on one or more of each. In the latter scenario, the remote server may be connected to the user terminal and/or to the mobile robot through any type of network, including a local area network (LAN) or a wide area network (WAN), or the connection may be made to an external computer (for example, through the Internet using an Internet Service Provider) and/or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions The foregoing is illustrative of embodiments of the present disclosure and is not to be construed as limiting thereof. Although a few example embodiments have been described, those skilled in the art will readily appreciate that many modifications are possible in the example embodiments without materially departing from the teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. An autonomous cleaning robot comprising:
    a drive system configured to maneuver the robot about an environment during a cleaning mission;
    a cleaning head configured to remove debris from a floor surface;
    a ranging device configured to communicate with a corresponding ranging device of each of a plurality of connected devices located in the environment, the ranging device configured to receive, at two or more different locations in the environment, from the corresponding ranging devices, respective two or more items of data indicative of an identity and a respective distance associated with each of the plurality of connected devices; and
    a controller configured to
        determine, using the two or more items of data received by the ranging device, locations of the plurality of connected devices, wherein a location of a first connected device of the plurality of connected devices is determined based on at least two of the two or more items of data, and
        transmit data to cause a remote user device to present a visual representation of the environment and visual indications indicative of the identities and locations of the plurality of connected devices in the environment.

2. The autonomous cleaning robot of claim 1, wherein the autonomous cleaning robot is configured to initiate a toggling operation of an individual connected device and detect corresponding changes to the environment.

3. The autonomous cleaning robot of claim 2, wherein the autonomous cleaning robot is configured to:
determine a location of the individual connected device based on the detected changes to the environment; and
transmit data to cause the remote user device to present a visual indication indicative of the location of the individual connected device.

4. The autonomous cleaning robot of claim 1, wherein the ranging device is configured to visually detect at least some of the plurality of connected devices.

5. The autonomous cleaning robot of claim 1, wherein the controller is configured to initiate transmission, to the remote user device, of data indicative of an operating state of a connected device of the plurality of connected devices to cause the remote user device to present a visual indication indicative of the operating state of the connected device.

6. The autonomous cleaning robot of claim 1, wherein the controller is configured to determine the locations of the plurality of connected devices over a plurality of missions performed by the autonomous cleaning robot.

7. The autonomous cleaning robot of claim 6, wherein the plurality of missions performed by the cleaning robot comprises at least one cleaning mission.

8. The autonomous cleaning robot of claim 6, wherein the plurality of missions performed by the cleaning robot comprises at least one patrolling mission.

9. The autonomous cleaning robot of claim 1, wherein the plurality of connected devices are distributed among multiple zones of the environment.

10. The autonomous cleaning robot of claim 1, wherein the controller is configured to determine that an individual connected device has moved in the environment with respect to another connected device and identify the individual device as a dynamic node.

11. The autonomous cleaning robot of claim 1, wherein the controller is configured to determine that an individual connected device is static in the environment with respect to another connected device and identify the individual device as a static node.

12. The autonomous cleaning robot of claim 1, wherein the ranging device is configured to receive data indicative of distances between pairs of individual connected devices in the environment, and
wherein the controller is configured to determine locations of the individual connected devices based on the distances between pairs of the individual connected devices.

13. A robot comprising:
a drive system configured to maneuver the robot about an environment;
a ranging device configured to communicate with a corresponding ranging device of each of a plurality of connected devices located in the environment, the ranging device configured to receive, at two or more different locations in the environment, from the corresponding ranging devices, two or more items of data indicative of an identity and a respective distance associated with each of the plurality of connected devices; and
a controller configured to
determine, using the two or more items of data received by the ranging device, locations of the plurality of connected devices, wherein a location of a first connected device of the plurality of connected devices is determined based on at least two of the two or more items of data, and
transmit data to cause a remote user device to present a visual representation of the environment and visual indications indicative of the locations of the plurality of connected devices in the environment.

14. The robot of claim 13, wherein the robot is configured to initiate a toggling operation of an individual connected device and detect corresponding changes to the environment.

15. The robot of claim 14, wherein the robot is configured to determine a location of the individual connected device based on the detected changes to the environment; and
transmit data to cause the remote user device to present a visual indication indicative of the location of the individual connected device.

16. The robot of claim 15, wherein the ranging device is configured to visually detect the plurality of connected devices.

17. The robot of claim 13, wherein the controller is configured to initiate transmission, to the remote user device, of data indicative of an operating state of a connected device of the plurality of connected devices to cause the remote user device to present a visual indication indicative of the operating state of the connected device.

18. The robot of claim 13, wherein the controller is configured to detect the location of the plurality of connected devices over a plurality of missions performed by the robot.

19. The robot of claim 13, wherein the plurality of connected devices are distributed among multiple zones of the environment.

20. The robot of claim 13, wherein the controller is configured to determine that an individual connected device has moved in the environment with respect to another connected device and tag the individual device, between at least two types of devices, as a dynamic node type of the at least two types.

21. The robot of claim 13, wherein the controller is configured to determine that an individual connected device is static in the environment with respect to another connected device and tag the individual device, between at least two types of devices, as a static node type of the at least two types.

22. The robot of claim 13, ranging device is configured to receive data indicative of distances between pairs of individual connected devices in the environment, and
wherein the controller is configured to determine locations of the individual connected devices based on the distances between pairs of the individual connected devices.

23. The autonomous cleaning robot of claim 1, wherein the controller is configured to generate a map of the environment using the two or more items of data received by the ranging device.

24. The autonomous cleaning robot of claim 23, wherein the controller is configured to localize the autonomous cleaning robot on the map of the environment.

25. The autonomous cleaning robot of claim 1, wherein the ranging device comprises a transceiver configured to receive radio frequency signals from the corresponding ranging devices and to transmit radio frequency signals to the corresponding ranging devices.

26. The autonomous cleaning robot of claim 1, wherein the ranging device is configured to handshake with each corresponding ranging device prior to receiving the data from the ranging device.

27. The autonomous cleaning robot of claim 1, wherein the ranging device is substantially identical to the corresponding ranging device of each of the plurality of connected devices.

28. The robot of claim 13, wherein the ranging device comprises a transceiver configured to receive radio frequency signals from the corresponding ranging devices and to transmit radio frequency signals to the corresponding ranging devices.

29. The robot of claim 13, wherein the ranging device is configured to handshake with each corresponding ranging device prior to receiving the data from the ranging device.

30. The robot of claim 13, wherein the ranging device is substantially identical to the corresponding ranging device of each of the plurality of connected devices.

31. The autonomous cleaning robot of claim 5, wherein the operating state comprises an on or off state of the connected device.

32. The autonomous cleaning robot of claim 1, wherein the at least two of the two or more items of data based on which the location of the first connected device is determined are collected as the autonomous cleaning robot moves through a trajectory during a single mission performed by the autonomous cleaning robot.

\* \* \* \* \*